US010891034B2

(12) United States Patent
Jatram et al.

(10) Patent No.: US 10,891,034 B2
(45) Date of Patent: Jan. 12, 2021

(54) APPARATUS AND METHOD OF OPERATING WEARABLE DEVICE

(71) Applicant: Samsung Electronics Co., Ltd., Gyeonggi-do (KR)

(72) Inventors: Abhishek Jatram, Bangalore (IN); Gaurav Gupta, Bangalore (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/547,112

(22) Filed: Aug. 21, 2019

(65) Prior Publication Data

US 2020/0117342 A1      Apr. 16, 2020

(30) Foreign Application Priority Data

Oct. 16, 2018   (IN) .............................. 201841039209
May 2, 2019     (KR) ........................ 10-2019-0051819

(51) Int. Cl.
| G06F 3/0484 | (2013.01) |
| G06K 19/077 | (2006.01) |
| G06F 1/16 | (2006.01) |
| H04W 72/04 | (2009.01) |
| H04W 4/80 | (2018.01) |

(52) U.S. Cl.
CPC .......... G06F 3/04842 (2013.01); G06F 1/163 (2013.01); G06K 19/07762 (2013.01); H04W 4/80 (2018.02); H04W 72/0493 (2013.01)

(58) Field of Classification Search
CPC ............... G06F 3/0484; G06F 3/04842; G06F 3/04845; G06F 3/04817; G06F 2203/04806; G06F 1/163; H04W 4/80; H04W 72/0493; G06K 19/07762; H04M 1/72583

USPC ......................................................... 345/173
See application file for complete search history.

(56) References Cited

U.S. PATENT DOCUMENTS

| 6,544,123 B1 * | 4/2003 | Tanaka .................... A63F 13/10 463/36 |
| 6,556,222 B1 * | 4/2003 | Narayanaswami .. G04G 9/0064 368/295 |
| 6,925,611 B2 | 8/2005 | SanGiovanni |
| 7,996,788 B2 * | 8/2011 | Carmichael ........... G06F 3/0482 715/834 |

(Continued)

FOREIGN PATENT DOCUMENTS

| KR | 1020140064690 | 5/2014 |
| KR | 1020150081140 | 7/2015 |

(Continued)

OTHER PUBLICATIONS

International Search Report dated Oct. 29, 2019 issued in counterpart application No. PCT/KR2019/008951, 10 pages.

*Primary Examiner* — Tom V Sheng
(74) *Attorney, Agent, or Firm* — The Farrell Law Firm, P.C.

(57) ABSTRACT

A method of operating a wearable device and a wearable device are provided. The method includes hierarchically displaying a plurality of icon sets arranged along a plurality of virtual closed loops on a display of the wearable device, obtaining a first input to a bezel ring of the wearable device, determining at least one icon in the plurality of icon sets based on the first input to the bezel ring, and executing a preset function corresponding to the determined at least one icon.

18 Claims, 36 Drawing Sheets

(56) References Cited

U.S. PATENT DOCUMENTS

| | | | |
|---|---|---|---|
| 8,207,986 B2* | 6/2012 | Nakamura | G06F 3/04817 |
| | | | 345/157 |
| 9,720,585 B2* | 8/2017 | Fadell | G06F 1/3231 |
| 10,194,060 B2 | 1/2019 | Mistry et al. | |
| 2005/0168435 A1 | 8/2005 | Reed et al. | |
| 2005/0268251 A1* | 12/2005 | Bennetts | H04M 1/72583 |
| | | | 715/810 |
| 2011/0083100 A1* | 4/2011 | Fyke | G06F 3/0412 |
| | | | 715/790 |
| 2012/0218303 A1* | 8/2012 | Nakada | G02B 27/017 |
| | | | 345/649 |
| 2013/0019205 A1 | 1/2013 | Gil et al. | |
| 2015/0331589 A1 | 11/2015 | Kawakita | |
| 2016/0202866 A1 | 7/2016 | Zambetti et al. | |
| 2016/0239142 A1* | 8/2016 | Kim | G06F 3/0488 |
| 2016/0320756 A1* | 11/2016 | Lee | G06F 3/04817 |
| 2017/0060100 A1 | 3/2017 | Loi et al. | |
| 2017/0102838 A1* | 4/2017 | Roy | G06F 3/0362 |
| 2017/0176950 A1* | 6/2017 | Jung | G04G 21/08 |
| 2017/0220137 A1 | 8/2017 | Han | |
| 2018/0101290 A1 | 4/2018 | Ding | |
| 2019/0113889 A1* | 4/2019 | Kumar | G06F 3/0485 |

FOREIGN PATENT DOCUMENTS

| | | |
|---|---|---|
| KR | 1020160067572 | 6/2016 |
| KR | 1020160087304 | 7/2016 |

* cited by examiner

FIG. 8
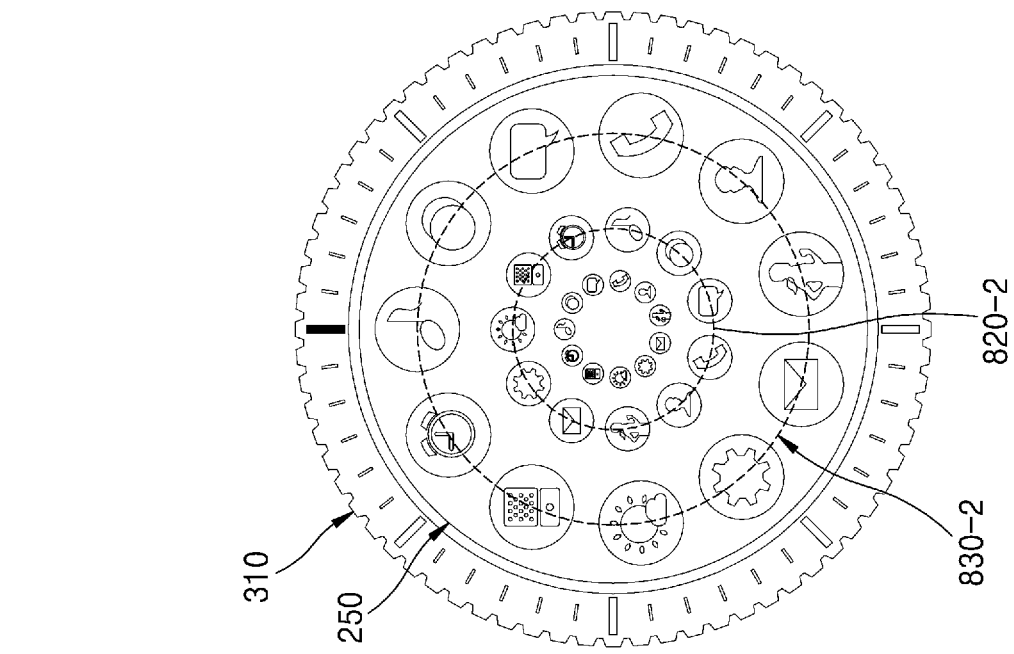
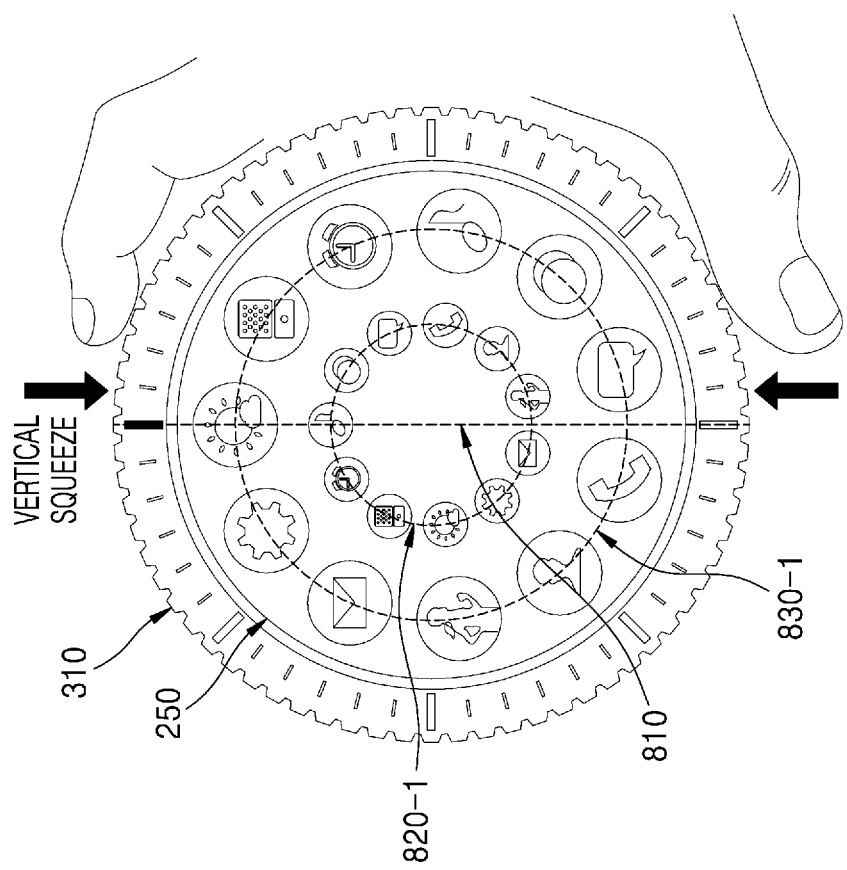

FIG. 12
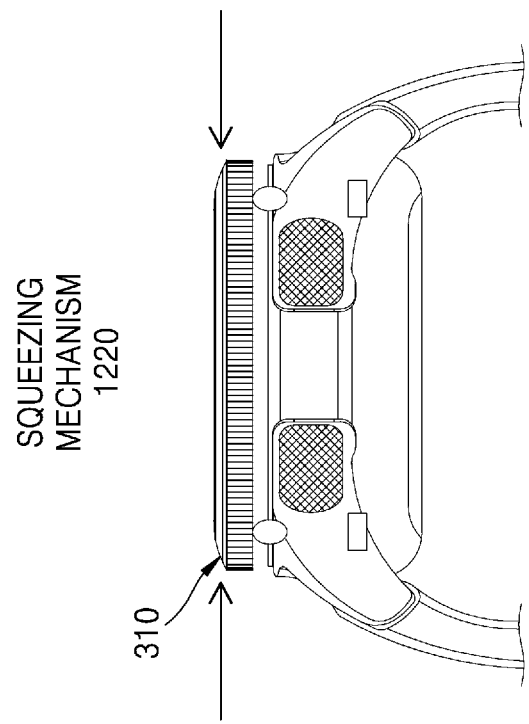
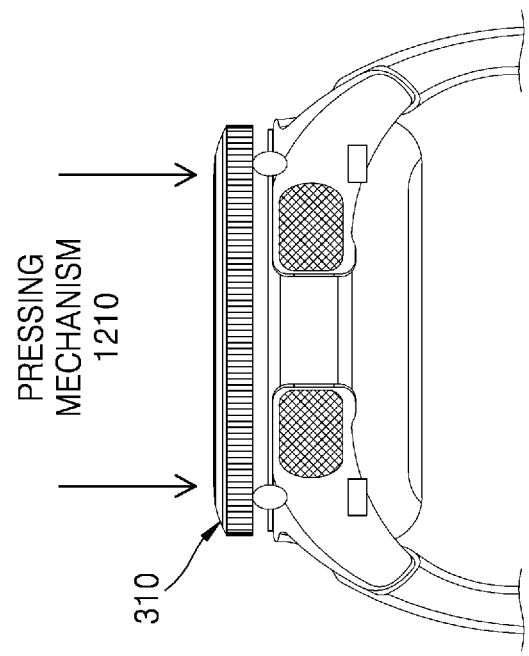

FIG. 19
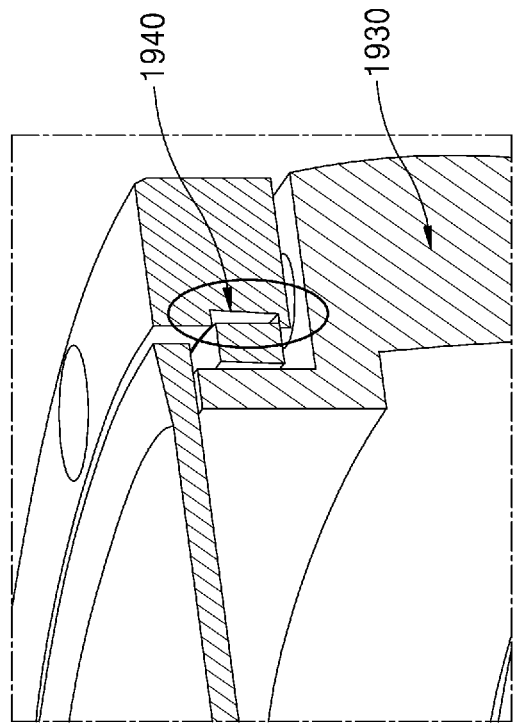
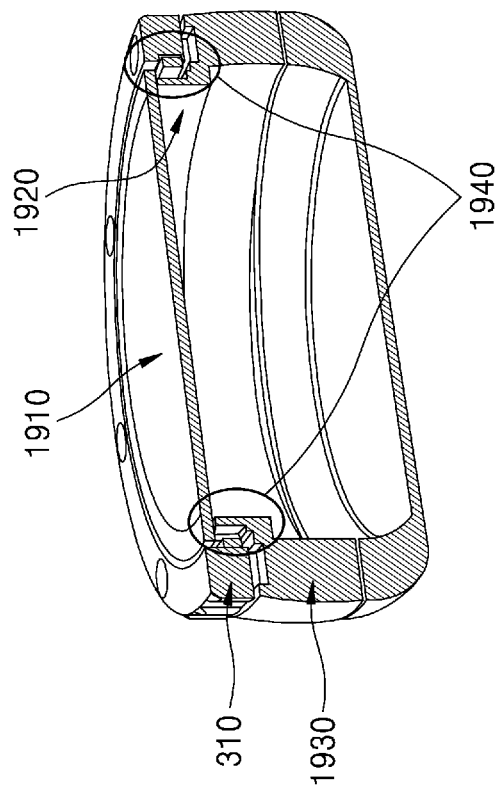

APPARATUS AND METHOD OF OPERATING WEARABLE DEVICE

CROSS-REFERENCE TO RELATED APPLICATION(S)

This application is based on and claims priority under 35 U.S.C. § 119 to Indian Patent Application No. 201841039209, filed on Oct. 16, 2018, in the Indian Patent Office, and Korean Patent Application No. 10-2019-0051819, filed on May 2, 2019, in the Korean Intellectual Property Office, the entire disclosures of which are incorporated herein by reference.

BACKGROUND

1. Field

The present disclosure relates generally to an apparatus and method of operating a wearable device.

2. Description of Related Art

In general, wearable devices provide improved portability to a user, thereby improving user convenience. In addition, wearable devices may display a plurality of icons representing a plurality of applications on a user interface. For example, icons of applications related to a message, an e-mail, social network services, a camera, or a telephone may be displayed on a user interface of a wearable device. Also, wearable devices may have a plurality of intelligent functions allowing a user to synchronize a wearable device with other electronic devices such as a smartphone and to perform various functions. Accordingly, there has been large demand for a function of displaying a plurality of icons on an interface of a wearable device.

SUMMARY

The present disclosure has been made to address at least the disadvantages described above and to provide at least the advantages described below.

In accordance with an aspect of the present disclosure, a method of operating a wearable device is provided. The method includes hierarchically displaying a plurality of icon sets arranged along a plurality of virtual closed loops on a display of the wearable device, obtaining a first input to a bezel ring of the wearable device, determining at least one icon in the plurality of icon sets based on the first input to the bezel ring, and executing a preset function corresponding to the determined at least one icon.

In accordance with an aspect of the present disclosure, a wearable device is provided. The wearable device includes a display, a bezel ring provided along a boundary of the display, a memory configured to store one or more instructions, and at least one processor configured to execute the one or more instructions to hierarchically display a plurality of icon sets arranged along a plurality of virtual closed loops on the display of the wearable device, obtain a first input to the bezel ring of the wearable device, determine at least one icon in the plurality of icon sets based on the first input to the bezel ring, and execute a preset function corresponding to the determined at least one icon.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 8 is a diagram of an example of controlling icons displayed on a wearable device by vertically squeezing the wearable device, according to an embodiment;

FIG. 12 is a diagram of examples of a pressing mechanism and a squeezing mechanism for executing various functions of a wearable device, according to an embodiment;

FIG. 19 is a diagram of a wearable device, according to an embodiment;

DETAILED DESCRIPTION

Figure 1A:
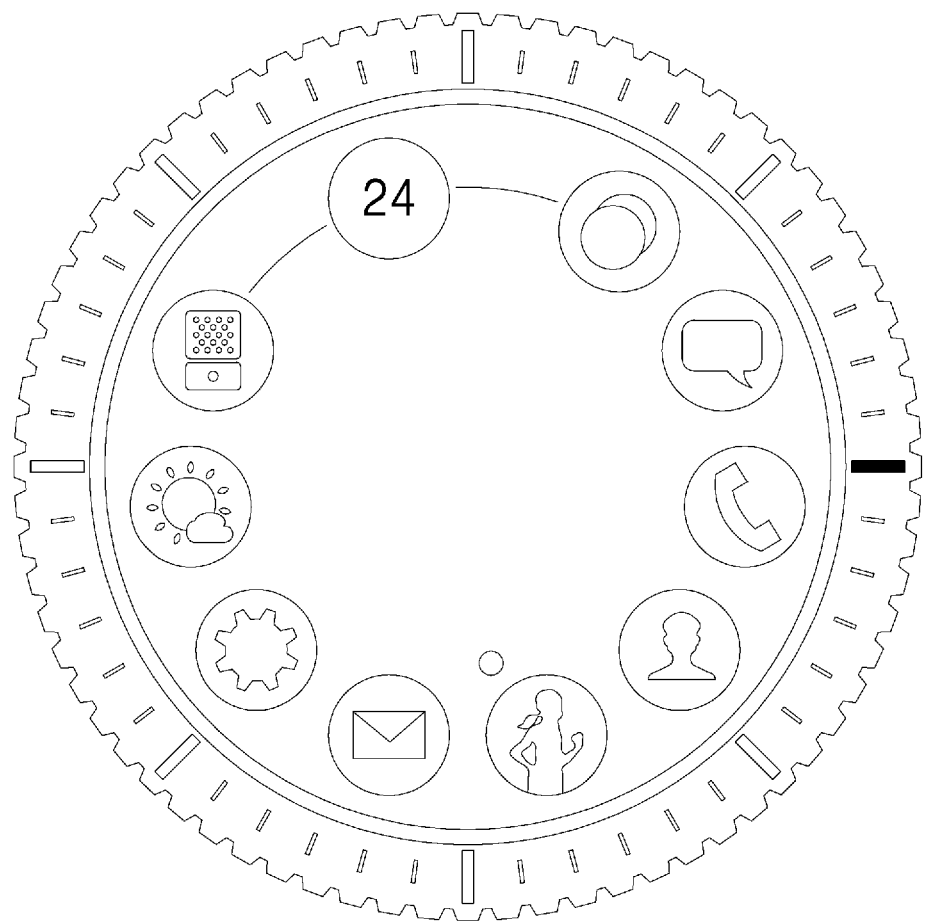
FIG. 1A is a diagram of an example of displaying icons on a wearable device, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

FIG. 1A is a diagram of an example of displaying icons on a wearable device, according to an embodiment.

Referring to FIG. 1A, because a wearable device generally has a limited display area, the number of icons that may be displayed on a display of the wearable device is restricted. Thus, a user may navigate an application that the user wants to use by rotating a bezel ring a plurality of times. Rotating of the bezel ring for a plurality of times may denote that the bezel ring is pivoted intermittently in a preset direction by a preset angle. Here, the preset direction may be a clockwise direction or a counter clockwise direction. In addition, the preset angle may denote a reference angle for the bezel ring to select a second icon starting from a first icon. When a reference angle for selecting the second icon from the first icon is 15 degrees, the user may select the second icon by rotating the bezel ring by 15 degrees angle from the first icon. When 9 applications are displayed on a display of the wearable device as shown in FIG. 1A, the user may want to navigate a 24th application. The user may rotate the bezel ring of the wearable device a plurality of times in order to navigate the 24th application. That is, the user may intermittently rotate the bezel ring in the preset direction by the preset angle.

As shown in FIG. 1A, icons of a fixed number of applications may be displayed on the display of the wearable device. Icons of 9 applications may be displayed on the wearable device. Also, a center area of the display of the wearable device is not used for displaying icons, and thus, there is a limitation in displaying icons of a plurality of applications.

Figure 1B:
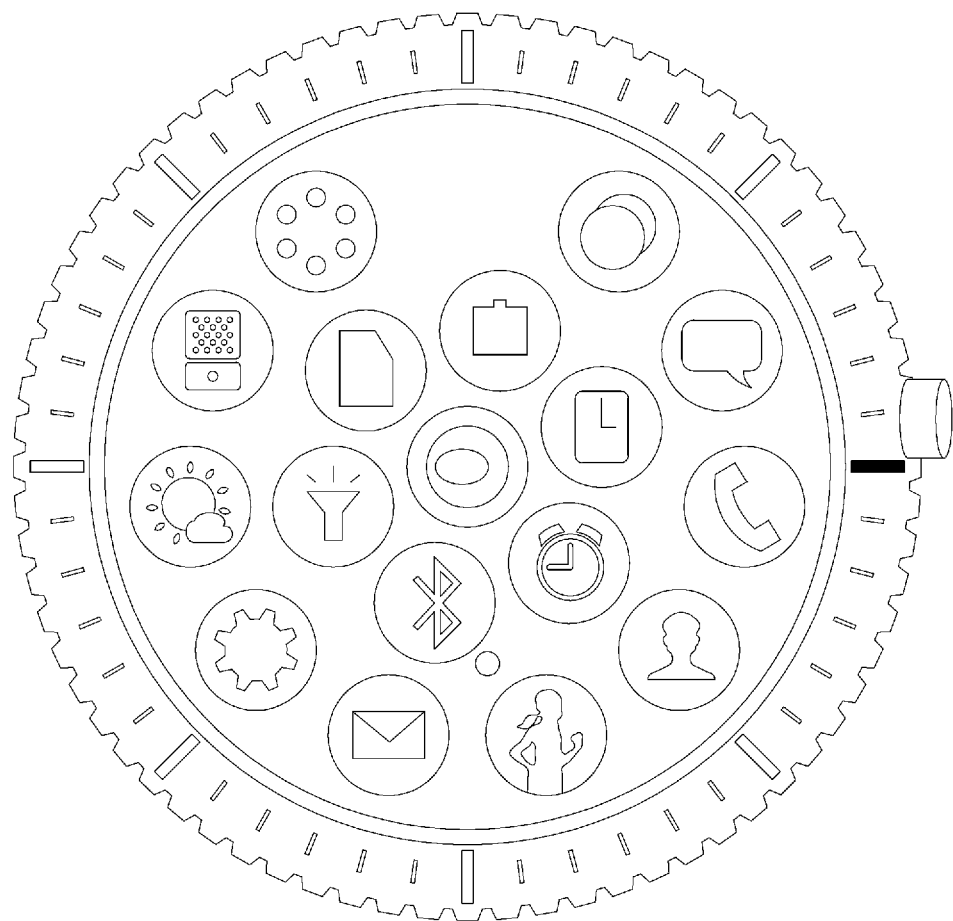
FIG. 1B is a diagram showing another example of displaying icons on a wearable device.

FIG. 1B is a diagram of another example of displaying icons on a wearable device, according to an embodiment.

Referring to FIG. 1B, application icons may be evenly distributed and displayed on the display of the wearable device. A crown of the wearable device may be used to navigate applications of the wearable device and select an application that the user is interested in. The user may rotate the crown in order to select the application that the user is interested in, from among the plurality of application icons displayed on the wearable device. Whenever the crown is rotated, a focus for indicating an interested application may be changed.

In the example of FIG. 1A, the number of icons that may be displayed on the display of the wearable device at once is restricted. Also, in the example of FIG. 1B, the user has to rotate the crown at least once in order to navigate the icon of the application that the user is interested in. In order to improve a user experience for navigating or selecting an application icon displayed on the wearable device, the disclosure provides a method for a user to interact with the wearable device.

An interaction may denote that the status of an application icon displayed on the display of the wearable device is changed when the user of the wearable device manipulates the display, the bezel ring, or the crown of the wearable device. The user may change a status (e.g., a size, a length, or location) of the application icon displayed on the display by pressing or squeezing the bezel ring of the wearable device. Pressing of the bezel ring of the wearable device may denote that pressure is applied to a lower end portion of the bezel ring. The pressing may denote that the user pushes the bezel ring downward from an upper end of the bezel ring. Squeezing of the bezel ring of the wearable device may denote that the pressure is applied in a direction towards a side surface of the bezel ring or in a direction towards the inside of the bezel ring from opposite ends of the bezel ring. The squeezing may denote that the user applies a pressure to the side surface of the bezel ring or a first portion and a second portion of a two-dimensional figure forming the bezel ring.

Also, the user may determine one of the plurality of icons by rotating the bezel ring of the wearable device. In addition, the user may change the status (e.g., a size, a length, or location) of the application icons displayed on the display by performing a touch input such as a swipe gesture, a tap gesture, and a drag gesture with respect to the display of the wearable device. Also, the user may change a status (e.g., a size, a length, or location) of the application icon displayed on the display by pressing or squeezing the crown of the wearable device. The user may determine one of the plurality of icons by rotating the crown of the wearable device. However, the interaction is not limited to the above described examples, and may denote various operations related to the wearable device.

This disclosure provides a method of allowing the interaction to be possible in the wearable device. The method of allowing the interaction to be possible may include displaying a plurality of icons in a series of concentric circles on a display screen of the wearable device and receiving one or more inputs about the bezel ring, etc., related to the display screen of the wearable device and the wearable device in order to interact with one or more icons. The method may also include dynamically interacting with the wearable device by using one or more inputs.

Also, one or more inputs received via the bezel ring of the wearable device may include a rotation of the bezel ring, a pressing of the bezel ring, a squeezing of the bezel ring, etc.

One or more inputs received through the display screen of the wearable device may include a swipe gesture, a tap gesture, a drag gesture, etc.

One or more icons in at least one concentric circle may be selected based on the rotation of the bezel ring. Here, one or more functions related to the one or more icons may be selected based on the rotation of the bezel ring.

At least one of the series of concentric circles on the display screen of the wearable device may be selected by pressing the bezel ring.

One or more of the series of concentric circles displayed on the display screen of the wearable device may be selected based on the pressure applied to the bezel ring.

One or more of the series of concentric circles displayed on the display screen of the wearable device may be selected based on a combination of pressure applied to the bezel ring, squeezing, rotation of the bezel ring, etc.

One or more of the series of concentric circles displayed on the display screen of the wearable device may be selected based on one or more inputs to the display screen.

The method of dynamically interacting with the wearable device by using one or more inputs to the display screen of the wearable device may include selecting one or more icons based on the one or more inputs and interacting with one or more functions regarding the one or more icons by using one or more inputs to the display screen, the bezel ring, etc.

The method of dynamically interacting with the wearable device by using one or more inputs may include interchanging locations of a plurality of icons in a first concentric circle with locations of a plurality of icons in a second concentric circle. Here, the first concentric circle may be displayed on an internal region of the display screen of the wearable device and the second concentric circle may be displayed on an external region of the display screen of the wearable device.

The number of interchangeable concentric circles may be proportional to the sizes of the one or more inputs.

A method of allowing the interaction to be possible on the wearable device includes displaying a plurality of icons in a series of concentric circles on the display screen of the wearable device, receiving a first input with respect to the bezel ring related to the wearable device, receiving a second input to the display screen of the wearable device, and dynamically interacting with one or more icons by using at least one of the first input or the second input in order to execute one or more processes on the wearable device.

The first input with respect to the bezel ring may include pressing of the bezel ring, squeezing of the bezel ring, etc.

The second input to the display screen of the wearable device may include a swipe gesture, a tap gesture, a drag gesture, a rotation of the bezel ring, etc.

Also, dynamically interacting with the wearable device by using the one or more inputs may include selecting one or more icons by using at least one of the first input or the second input, and interacting with one or more functions related to the one or more icons by using the first input and the second input.

A wearable device may include a watch dial including a display for displaying information to the user, a bezel ring including a plurality of magnets, an outer periphery for arranging a plurality of springs, and an inner periphery for housing an inertial sensor at a predetermined location. The wearable device may include the plurality of springs on the outer periphery of the watch dial and a plurality of pressure sensors arranged among the plurality of springs, and the bezel ring may support the rotation, pressing, or squeezing of the watch dial in order to execute one or more operations on the wearable device.

The wearable device may further include a plurality of capacitive sensors along the inner periphery of the watch dial in order to detect a variation in a capacitance based on the movement of the bezel ring.

The plurality of pressure sensors of the wearable device may detect the pressing or squeezing of the bezel ring.

The display of the wearable device may include a plurality of display screens. The display screens displayed thereon may be selected by using the bezel ring.

Also, the display of the wearable device may display a plurality of icons in a series of concentric circles on the display screen.

The bezel ring of the wearable device may receive one or more inputs from a user in order to interact with the one or more icons on the display screen.

One or more inputs received via the bezel ring of the wearable device may include a rotation of the bezel ring, a pressing of the bezel ring, a squeezing of the bezel ring, etc.

One or more icons with respect to at least one concentric circle displayed on the display screen of the wearable device may be selected based on the pressing or squeezing of the bezel ring, and one or more functions regarding the one or more icons may be selected based on the rotation of the bezel ring.

The series of concentric circles on the display screen of the wearable device may be based on the squeezing or pressing of the bezel ring.

Also, the method of allowing the interaction to be possible in the wearable device may include displaying a plurality of icons in the series of concentric circles on the display screen of the wearable device, receiving one or more inputs with respect to the display screen of the wearable device, a crown related to the wearable device, etc., in order to interact with the plurality of icons, and dynamically interacting with the wearable device by using the one or more inputs.

The method of allowing the interaction to be possible in the wearable device may include displaying a plurality of icons in the series of concentric circles on the display screen of the wearable device, receiving a first input and a second input through the bezel ring related to the wearable device in order to interact with the plurality of icons, determining a combined size of the first input and the second input, and dynamically interacting with the wearable device based on the combined size of the first input and the second input.

The first input and the second input received through the bezel ring may include rotation of the bezel ring, pressing of the bezel ring, or squeezing of the bezel ring.

Figure 2:
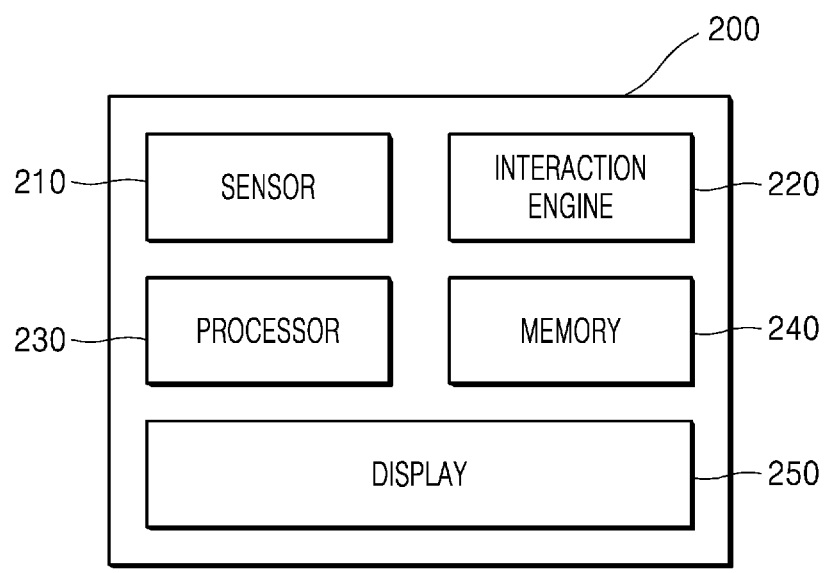
FIG. 2 is a diagram of a wearable device, according to an embodiment.

FIG. 2 is a diagram of a wearable device 200, according to an embodiment.

Referring to FIG. 2, the wearable device 200 may include a sensor 210, an interaction engine 220, a processor 230, a memory 240, and a display 250. However, not all the elements shown in FIG. 2 are essential elements of the wearable device 200. The wearable device 200 may include more or less elements than those shown in FIG. 2.

The wearable device 200 may denote an arbitrary electronic device that may be worn on a human body. The wearable device 200 may include a smart watch, a smart glass, a smart band, etc.

The sensor 210 may include a pressure sensor, a magnetic sensor, a capacitive sensor, etc. The sensor 210 may receive a plurality of inputs to the display screen of the wearable device 200 or the bezel ring of the wearable device 200, for interacting with one or more icons. One or more inputs received through the bezel ring may include rotation of the bezel ring, pressing of the bezel ring, squeezing of the bezel ring, etc. Also, the inputs received through the display screen of the wearable device 200 may include a swipe gesture, a tap gesture, a drag gesture, etc.

One or more icons in a concentric circle displayed on the display screen of the wearable device 200 may be selected based on the rotation of the bezel ring, and one or more functions regarding one or more icons may be selected based on the rotation of the bezel ring. Also, at least one of a series of concentric circles displayed on the display screen of the wearable device 200 may be selected by applying pressure to the bezel ring. Various interactions executed on the wearable device 200 may be determined by the sensor 210 by measuring various parameters such as pressure, magnetic force, or capacitance.

The interaction engine 220 may dynamically determine operations performed on the wearable device 200 based on an output from the sensor 210. Also, the interaction engine 220 may select one or more icons based on one or more inputs received by the sensor 210. The interaction engine 220 may interact with one or more functions related to the one or more icons.

The processor 230 may interact with hardware elements such as the sensor 210, the interaction engine 220, the memory 240, and the display 250, for making the wearable device 200 interact. The processor 230 may control overall operations of the wearable device 200 and may include at least one processor such as a CPU, graphics processing unit (GPU), etc.

The processor 230 may control other elements included in the wearable device 200 for executing operations for driving the wearable device 200. The processor 230 may execute programs stored in the memory 240, read files from the memory 240, or store new files in the memory 240. The processor 230 may perform operations for driving the wearable device 200 by executing programs stored in the memory 240.

The memory 240 may include non-volatile storage elements. The non-volatile storage elements may include magnetic hard discs, optical discs, floppy discs, flash memories, or electrically programmable ROM (EPROM) or electrically erasable and programmable ROM (EEPROM). Also, the memory 240 may include a non-transitory storage medium. The term "non-transitory" may denote that the storage medium is not implemented in carrier waves or propagated signals. However, the term "non-transitory" should not be construed that the memory 240 is non-movable. The memory 240 may store information greater than the capacity of the memory 240. The non-transitory storage medium may store data that may change (e.g., in random access memory (RAM) or a cache) over time.

Programs such as applications and various types of data such as files may be installed and stored in the memory 240. The processor 230 may access data stored in the memory 240 to use the data, or may store new data in the memory 240.

The display 250 may display a plurality of icons in a series of concentric circles. Also, the display 250 may display a plurality of display screens. In addition, at least one of the display screens may be selected by using the bezel ring. The display 250 and the display screen may be used interchangeably.

The wearable device 200 may include the display 250, the bezel ring formed along a boundary of the display 250, the memory 240 storing one or more instructions, and at least one processor 230 hierarchically displaying sets of a plurality of icons arranged along a plurality of virtual closed loops on the display 250 of the wearable device 200, obtaining a first input with respect to the bezel ring of the wearable device 200, determining at least one of the icons in the sets of the plurality of icons based on the first input to the bezel ring, and executing one or more instructions to make a preset function corresponding to the determined at least one icon executed.

The plurality of virtual closed loops include a first virtual closed loop and a second virtual closed loop, and the plurality of icon sets include a first set of icons arranged along the first virtual closed loop and a second set of icons arranged along the second virtual closed loop.

The processor 230 may display the first set of icons along the boundary of the display 250 and display the second set of icons within the first virtual closed loop configured by the first set of icons, by executing one or more instructions.

Icons in the second set of icons may be displayed smaller than those of the first set of icons.

The processor 230 may select one of the icons in the first set of icons displayed along the boundary of the display 250 based on the first input to the bezel ring, by executing one or more instructions.

The first input to the bezel ring may include at least one of rotation of the bezel ring, pressing of the bezel ring, or squeezing of the bezel ring.

The processor 230 may display the second set of icons along the boundary of the display 250 and display the first set of icons within the virtual closed loop configured by the second set of icons based on the second input to the bezel ring, by executing one or more instructions.

Icons in the first set of icons may be displayed smaller than those of the second set of icons.

The second input to the bezel ring may include at least one of rotation of the bezel ring, pressing of the bezel ring, or squeezing of the bezel ring.

The plurality of virtual closed loops may be two-dimensional figures having substantially the same centers as one another within a predetermined critical value range.

Although FIG. 2 shows hardware elements of the wearable device 200, embodiments of the disclosure are not limited thereto. The wearable device 200 may include more or less elements than those of FIG. 2. Also, labels or names of the elements are only used for description, but do not limit the scope of the disclosure. In order to make the interaction possible on the wearable device 200, one or more elements may be combined to execute the same or substantially similar functions.

Although not shown in FIG. 2, the wearable device 200 may include a transceiver. Here, the transceiver may communicate with an electronic device that is connected to the wearable device 200 via wires or wirelessly. The wearable device 200 may be wirelessly connected to a terminal or another electronic device via Bluetooth, Bluetooth low energy (BLE), ultra wideband (UWB), or Wi-Fi.

Figure 3:
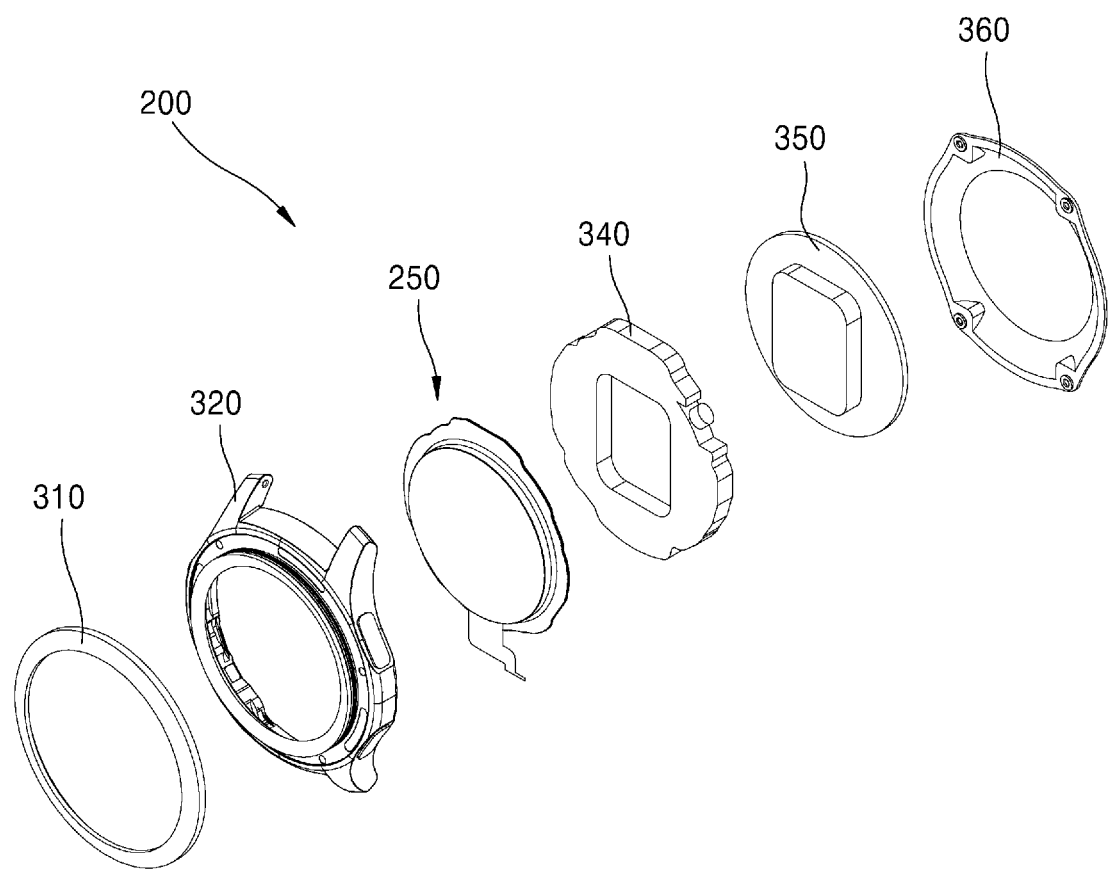
FIG. 3 is a diagram of a wearable device, according to an embodiment.

FIG. 3 is a diagram of the wearable device 200, according to an embodiment.

Referring to FIG. 3, the wearable device 200 may include a bezel ring 310, a front case 320, the display 250, a bracket 340, a main board 350, and a rear case 360. However, not all the elements shown in FIG. 3 are essential elements of the wearable device 200. The wearable device 200 may include more or less elements than those shown in FIG. 3.

The bezel ring 310 may rotate on the wearable device. Also, reed switches arranged under the bezel ring 310 may detect rotation of the bezel ring 310 in a clockwise direction or a counter clockwise direction. The bezel ring 310 may include an elastic material. When a user presses the bezel ring 310, a shape of the bezel ring 310 may vary depending on an intensity or a direction of the pressure applied by the user to the bezel ring 310. When the user presses the bezel ring 310 in a vertical direction, a radius of the bezel ring 310 may decrease in the vertical direction and increase in a horizontal direction. Also, when the user presses the bezel ring 310 in the horizontal direction, the radius of the bezel ring 310 may decrease in the horizontal direction and increase in the vertical direction.

Figure 4:
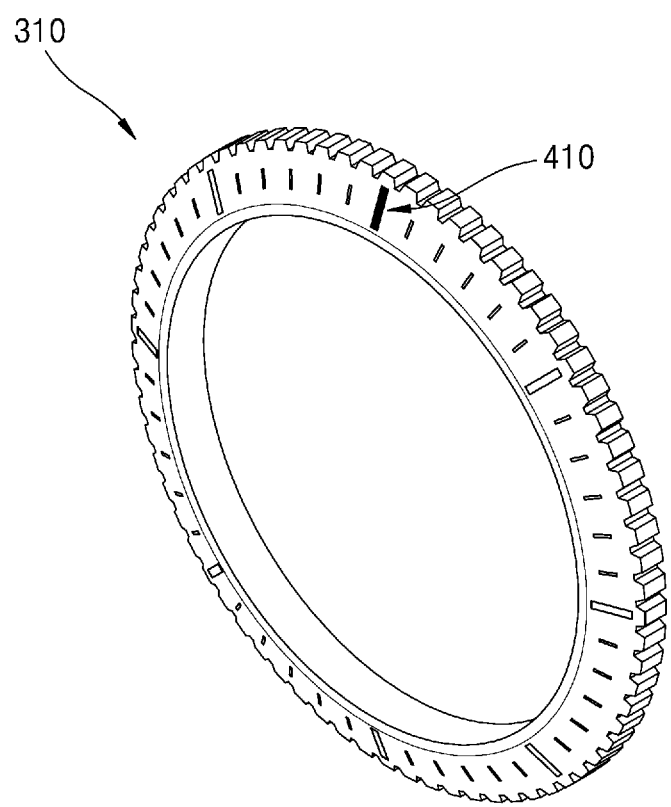
FIG. 4 is a diagram of a bezel ring of a wearable device, according to an embodiment.

FIG. 4 is a diagram of the bezel ring 310 of the wearable device 200, according to an embodiment.

Referring to FIG. 4, the bezel ring 310 may include a plurality of holes 410 for providing the user with tactile feel during rotation. The bezel ring 310 may include 24 holes. Ceramic balls used to rotate the bezel ring 310 may be engaged with or disengaged from one another during the rotation of the bezel ring 310. Also, the bezel ring 310 may include a plurality of magnets for sensing a rotating direction of the bezel ring 310. The bezel ring 310 may include four magnets for sensing the rotating direction of the bezel ring 310. However, not all the elements shown in FIG. 4 are essential elements of the bezel ring 310. The bezel ring 310 may include more or less elements than those shown in FIG. 4.

Figure 5:
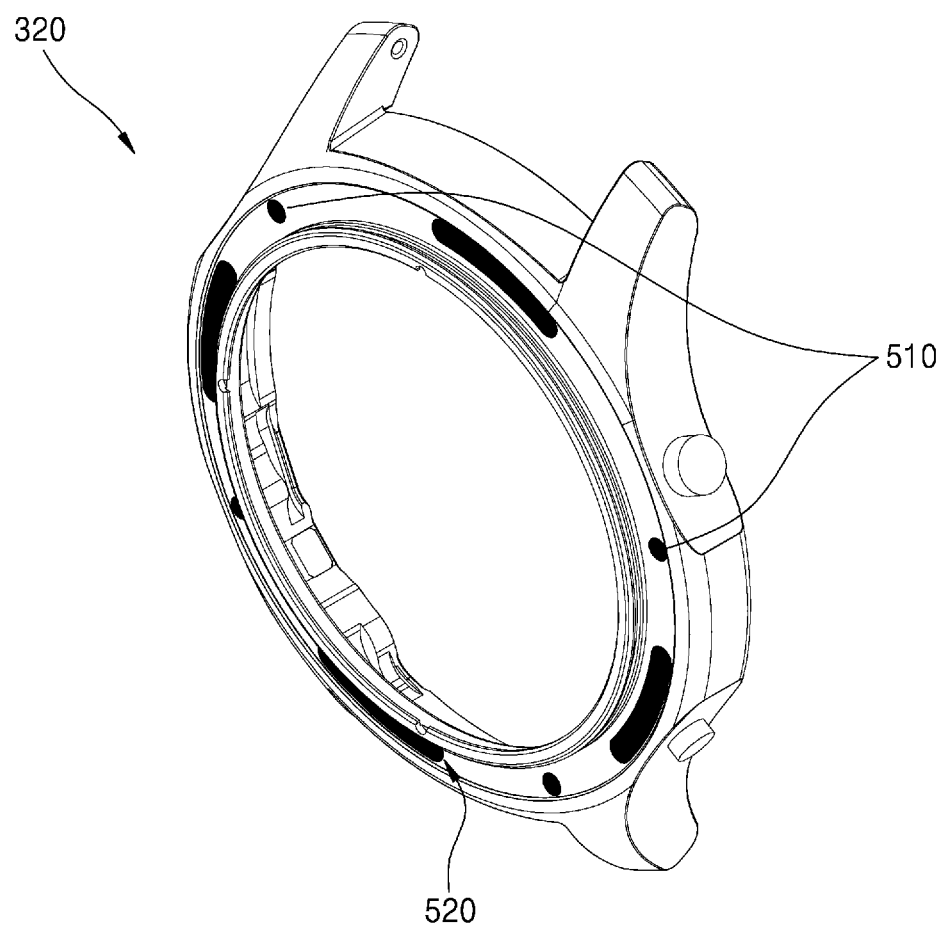
FIG. 5 is a diagram of a front portion of a wearable device, according to an embodiment.

FIG. 5 is a diagram of a front portion of the wearable device 200, according to an embodiment.

Referring to FIG. 5, the front case 320 of the wearable device 200 may include a plurality of holes 510 for a compression spring and ceramic balls. The front case 320 may include four holes. The front case 320 may lock the rotation operation by using the plurality of holes 510 and may provide tactile feedback. The tactile feedback may denote that the pressure applied by the user to the bezel ring 310 located on the front case 320 is provided to the wearable device 200. Also, the front case 320 may include a Hall Effect sensor and a reed switch 520 for detecting a direction in which magnets included in the bezel ring 310 move. However, not all the elements shown in FIG. 5 are essential elements of the front case 320. The front case 320 may include more or less elements than those shown in FIG. 5.

Figure 6A:
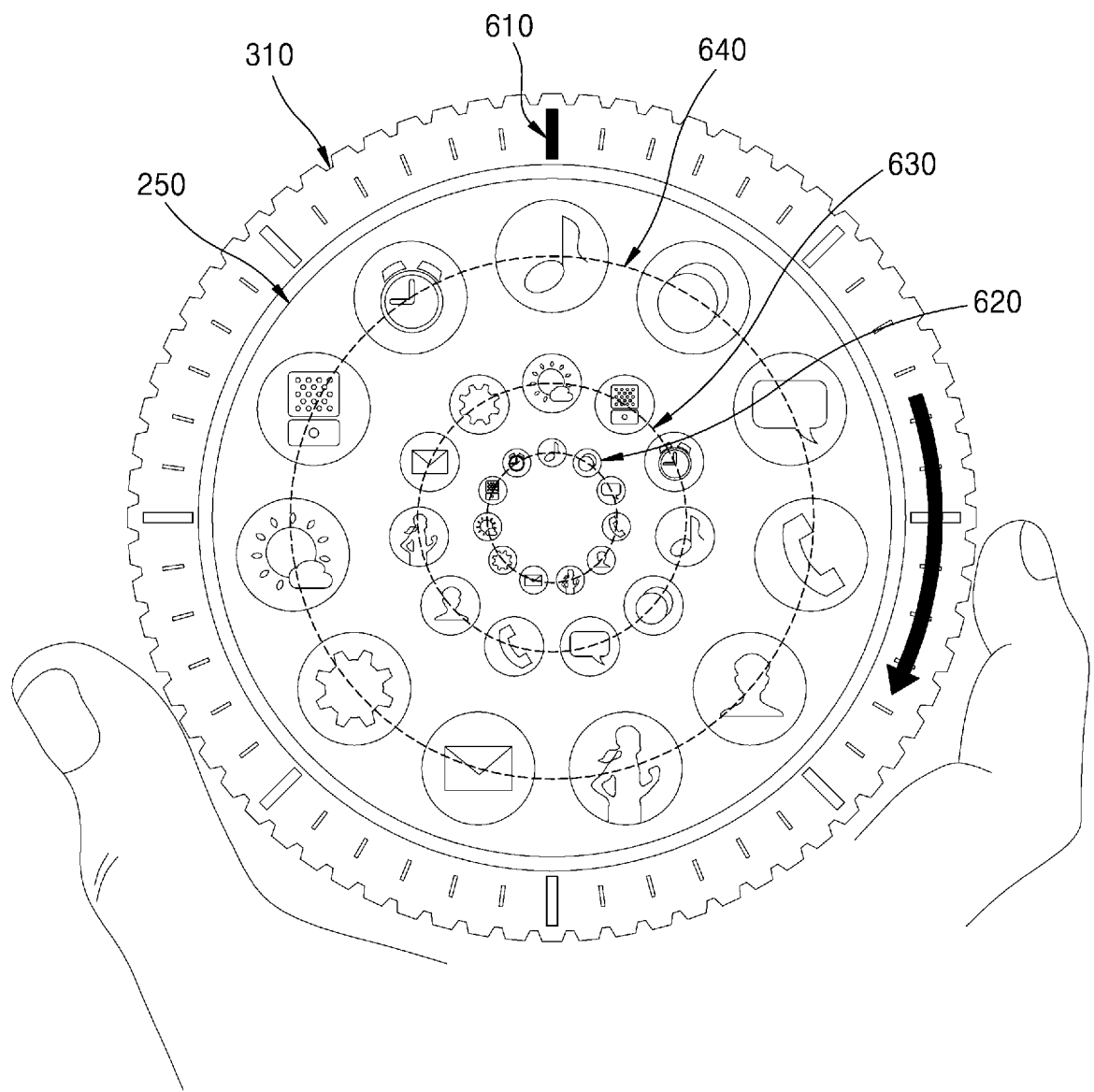
FIG. 6A is a diagram of an example of displaying icons arranged along a series of concentric circles on a wearable device, according to an embodiment.

FIG. 6A is a diagram of an example of displaying icons arranged along a series of concentric circles on the wearable device 200, according to an.

Referring to FIG. 6A, the user of the wearable device 200 may want to access an application icon that is located on an innermost concentric circle of the wearable device 200. The user may squeeze or press the bezel ring 310 of the wearable device 200 in order to navigate the innermost concentric circle. As shown in FIG. 6A, based on the pressure applied by the user to the bezel ring 310 of the wearable device 200, the innermost concentric circle may be zoomed in on the display screen displayed on the display 250 of the wearable device 200. As such, the interaction between the wearable device 200 and the user may be simplified, and the interaction between the wearable device 200 and the user may be determined based on the pressure applied to the bezel ring 310 of the wearable device 200.

The plurality of icon sets arranged along a plurality of virtual closed loops may be hierarchically displayed on the display 250 of the wearable device 200. A first virtual closed loop 620 may be arranged at an innermost portion based on the center of the display 250, a second virtual closed loop 630 may be arranged on an outer portion of the first virtual closed loop 620, and a third virtual closed loop 640 may be arranged on an outer portion of the second virtual closed loop 630. The plurality of virtual closed loops may be two-dimensional (2D) figures having an identical center. The identical center may denote a physically identical center, or may denote points that may be determined to be at substantially the same location within a predetermined critical value. The first virtual closed loop 620, the second virtual closed loop 630, and the third virtual closed loop 640 may be formed as circles having substantially the same center within a predetermined critical value range from the center of the display 250. The virtual closed loops having substantially the same centers within a predetermined critical value may denote concentric circles. The first virtual closed loop 620 may be referred to as a first concentric circle, the second virtual closed loop 630 may be referred to as a second concentric circle, and the third virtual closed loop 640 may be referred to as a third concentric circle.

The user of the wearable device 200 may squeeze or press the bezel ring 310. By squeezing or pressing the bezel ring 310, locations of the icons on the first virtual closed loop 620 may be changed to locations of icons on the second virtual closed loop 630. Also, by additionally squeezing or pressing the bezel ring, the locations of the icons on the second virtual closed loop 630 may be changed to the locations of icons on the third virtual closed loop 640. Changing of the locations of the icons displayed on the display 250 from the virtual closed loop (e.g., first virtual closed loop 620) that is adjacent to the center of the display 250 to a virtual closed loop (e.g., the second virtual closed loop 630 or the third virtual closed loop 640) that is farther from the center of the display 250 may be defined as a zoom-in operation. On the contrary, changing of the locations of the icons displayed on the display 250 from a virtual closed loop far from the center of the display 250 (e.g., the second virtual closed loop 630 or the third virtual closed loop 640) to a virtual closed loop close to the center of the display 250 (e.g., the first virtual closed loop 620) may be defined as a zoom-out operation. The user of the wearable device 200 may arrange the icons on the first virtual closed loop 620 onto the third virtual closed loop 640 by using the zoom-in operation.

Figure 6B:
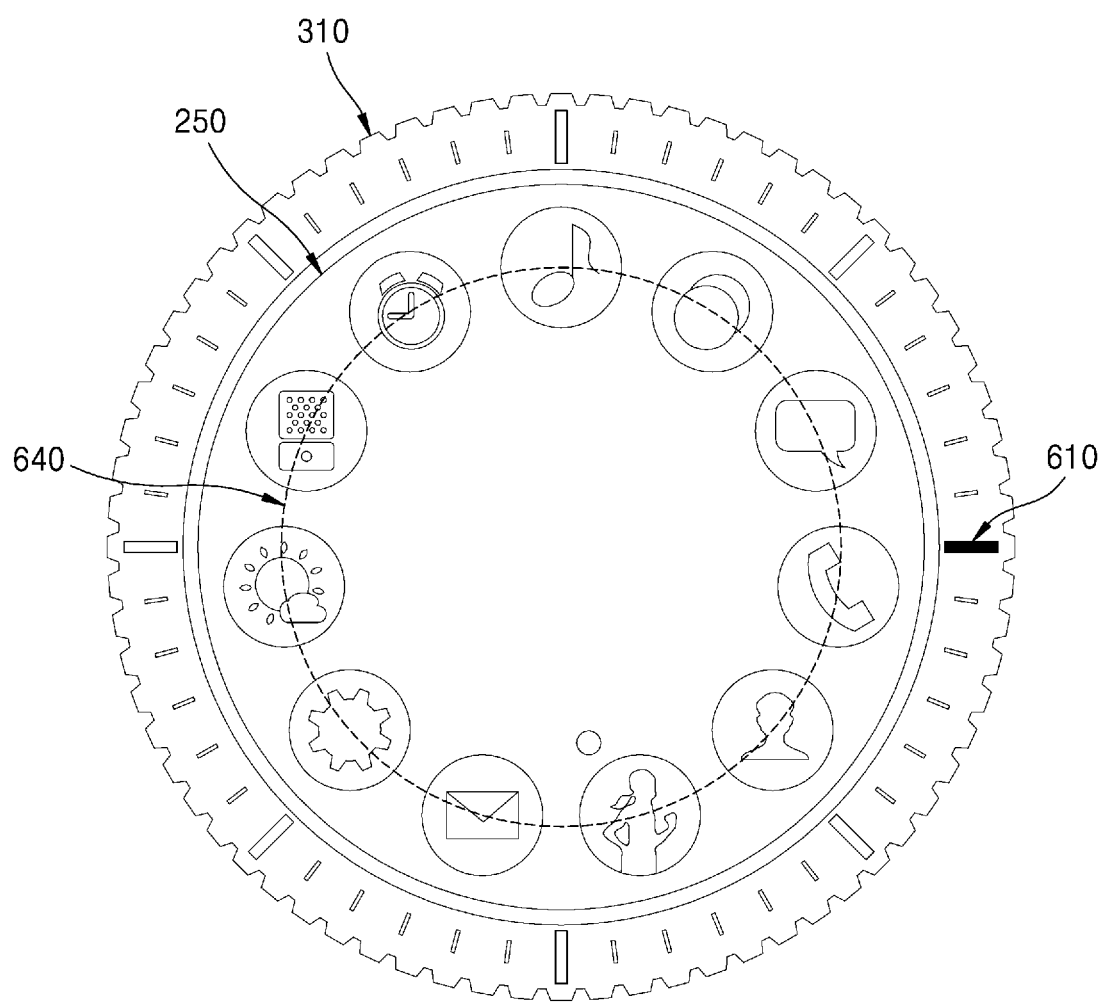
FIG. 6B is a diagram of an example of selecting a certain icon from among icons displayed on a wearable device, according to an embodiment.

FIG. 6B is a diagram of an example of selecting a certain icon from among icons displayed on the wearable device 200, according to an embodiment.

Referring to FIG. 6B, the user of the wearable device 200 may navigate the icons arranged on the third virtual closed loop 640 by rotating the bezel ring 310. Here, as the bezel ring 310 rotates, an indicator 610 on the bezel ring 310 may also rotate. The user may rotate the bezel ring 310 so that the indicator 610 indicates 3 o'clock from 12 o'clock on the display 250. Through the rotation of the bezel ring 310, a telephone application icon from a music application icon may be selected.

Figure 7:
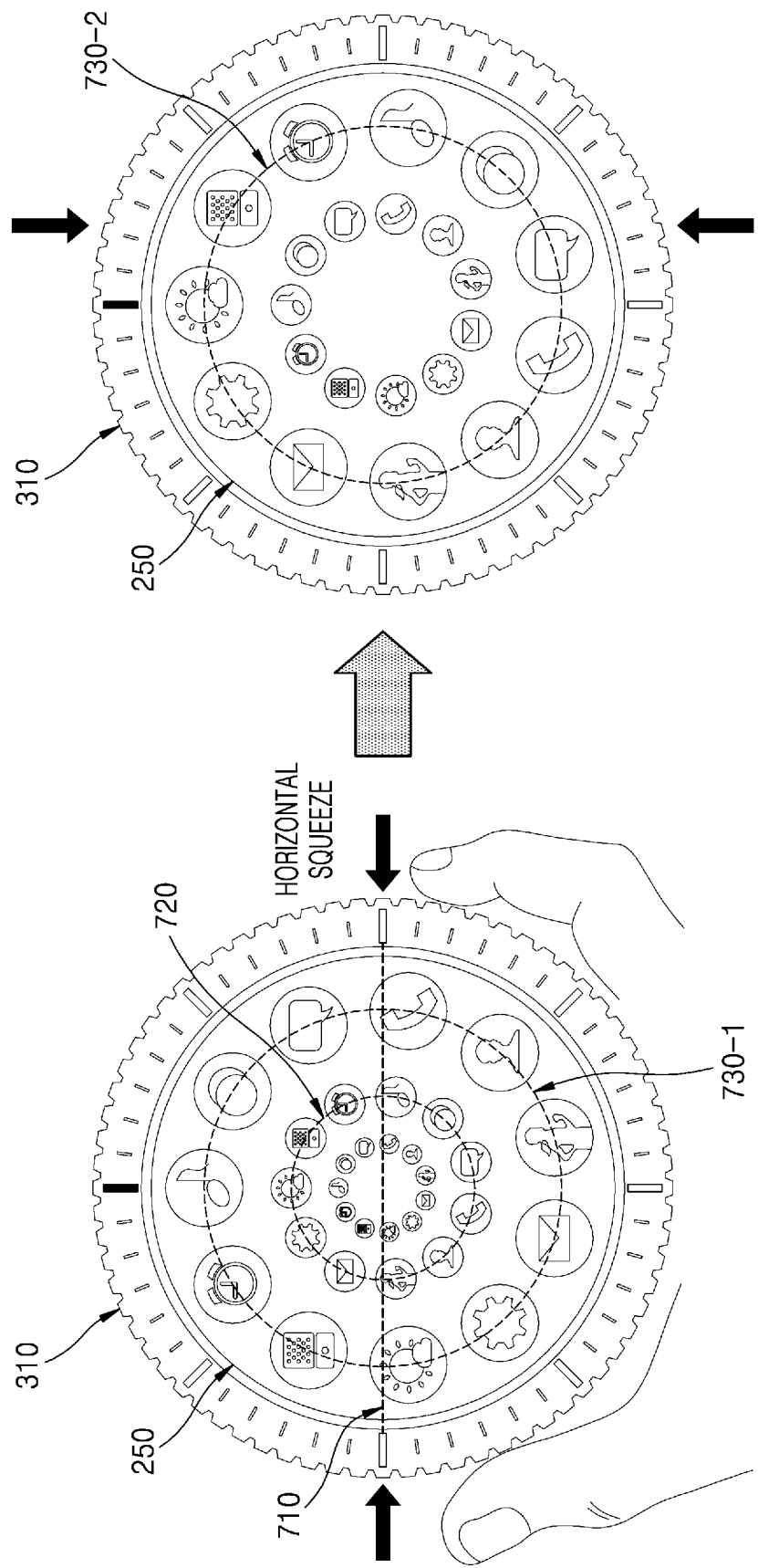
FIG. 7 is a diagram of an example of controlling icons displayed on a wearable device by horizontally squeezing the wearable device, according to an embodiment.

FIG. 7 is a diagram of an example of controlling icons displayed on the wearable device 200 by horizontally squeezing the wearable device 200, according to an embodiment.

Referring to FIG. 7, a scenario in which icons of a plurality of applications on the wearable device 200 are arranged as concentric circles on the display 250 may be considered. The user of the wearable device 200 may perform a zoom-in operation in order to navigate the application icons on a second virtual closed loop 720. The user may perform the zoom-in operation by horizontally squeezing the bezel ring 310 of the wearable device 200 based on a horizontal axis 710. Through the horizontal squeezing, the application icons arranged on the second virtual closed loop 720 may be arranged on a third virtual closed loop 730-2 at an outermost portion of the display 250 (i.e., the circumference). The user may select an application icon arranged on the third virtual closed loop 730-2 by rotating the bezel ring 310.

When the user wants to navigate applications that were on a previous third virtual closed loop 730-1, the user may perform a zoom-out operation through a vertical squeezing as shown in FIG. 8 below.

FIG. 8 is a diagram of an example of controlling icons displayed on the wearable device 200 by vertically squeezing the wearable device 200, according to an embodiment.

Referring to FIG. 8, the user of the wearable device 200 may perform the zoom-out operation in order to navigate application icons arranged on a second virtual closed loop 820-1. The user may perform the zoom-out operation by vertically squeezing the bezel ring 310 of the wearable device 200 based on a vertical axis 810. Through the vertical squeezing, the application icons arranged along a third virtual closed loop 830-1 may be arranged on a second virtual closed loop 820-2.

Through the vertical squeezing, the application icons arranged along a second virtual closed loop 820-1 may be arranged on a third virtual closed loop 830-2. The user may select an application icon arranged on the third virtual closed loop 830-2 by rotating the bezel ring 310. That is, through the vertical squeezing, the application icons arranged along the second virtual closed loop 820-1 may be zoomed-in on to the third virtual closed loop 830-2, and the application icons arranged along the third virtual closed loop 830-1 may be zoomed-out on along the second virtual closed loop 820-2.

Also, the zoom-in or zoom-out operation of the application icons arranged along a virtual closed loop may be executed when the user pushes down the bezel ring 310 of the wearable device and performs swiping/dragging over the display screen of the wearable device 200.

According to the method illustrated with reference to FIGS. 7 and 8, the user of the wearable device 200 may zoom-in or zoom-out on the icons arranged along a plurality of virtual closed loops by squeezing the bezel ring 310.

Figure 9:
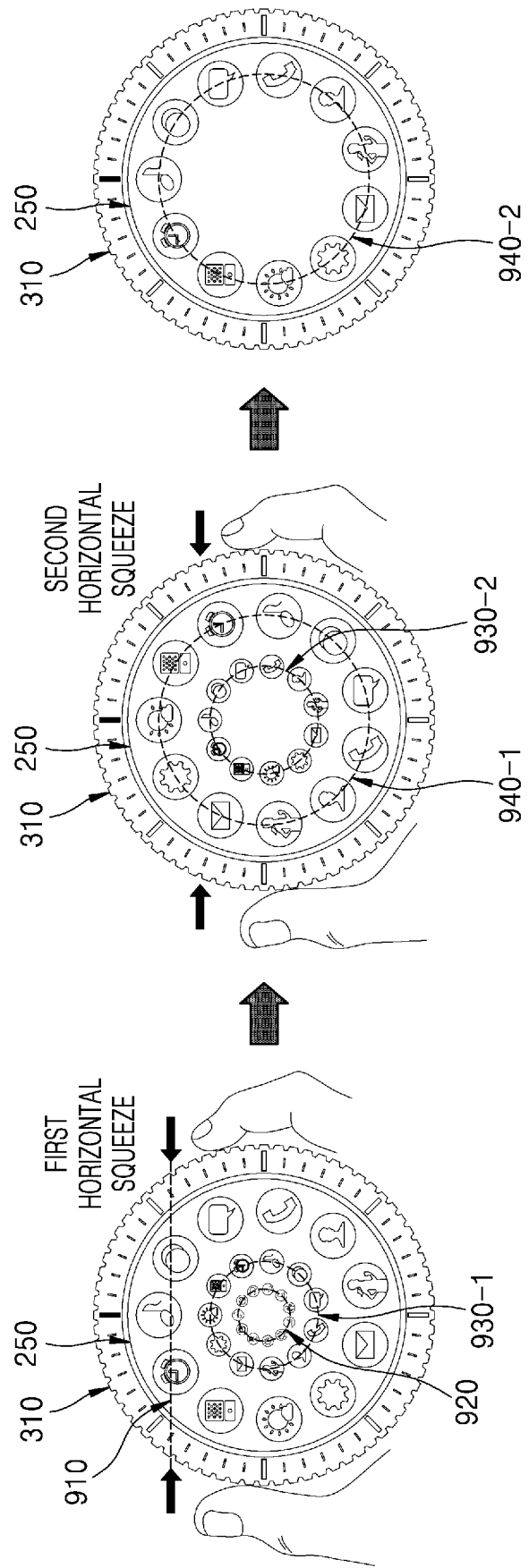
FIG. 9 is a diagram of an example of controlling icons displayed on a wearable device by laterally squeezing the wearable device, according to an embodiment.

FIG. 9 is a diagram of an example of controlling icons displayed on the wearable device 200 by laterally squeezing the wearable device 200, according to an embodiment.

Referring to FIG. 9, a first virtual closed loop 920 and a second virtual closed loop 930-1 may be displayed on the display 250 of the wearable device 200. The user of the wearable device 200 may perform the zoom-in operation in order to navigate application icons arranged along the second virtual closed loop 930-1. The user may squeeze the bezel ring 310 of the wearable device 200 in a direction of a horizontal axis 910. Here, the user's squeezing of the bezel ring 310 of the wearable device 200 in the direction of the horizontal axis 910 may be referred to as a first horizontal squeezing.

Through the first horizontal squeezing, the application icons arranged along the second virtual closed loop 930-1 of the wearable device 200 may be arranged along a third virtual closed loop 940-1 on a circumference of the display 250. Also, the application icons arranged along the first virtual closed loop 920 of the wearable device 200 may be arranged along a second virtual closed loop 930-2 located inside the third virtual closed loop 940-1.

After the first horizontal squeezing, the user of the wearable device 200 may squeeze the bezel ring 310 in the direction of the horizontal axis 910 in order to zoom-in on the application icons arranged along the second virtual closed loop 930-2. Here, the user's squeezing of the bezel ring 310 of the wearable device 200 in the direction of the horizontal axis 910 may be referred to as a second horizontal squeezing.

Through the second horizontal squeezing, the icons arranged along the second virtual closed loop 930-2 of the wearable device 200 may be arranged along the third virtual closed loop 940-2. That is, the application icons arranged along the first virtual closed loop 920 that is closest to the center of the display 250 before the first horizontal squeezing may be arranged along the second virtual closed loop 930-2 after the first horizontal squeezing, and may be arranged along the third virtual closed loop 940-2 after the second horizontal squeezing.

In the example illustrated with reference to FIG. 9, the user of the wearable device 200 may navigate the plurality of application icons arranged on the display 250 of the wearable device 200 by squeezing the bezel ring 310 of the wearable device 200 at least once.

Figure 10:
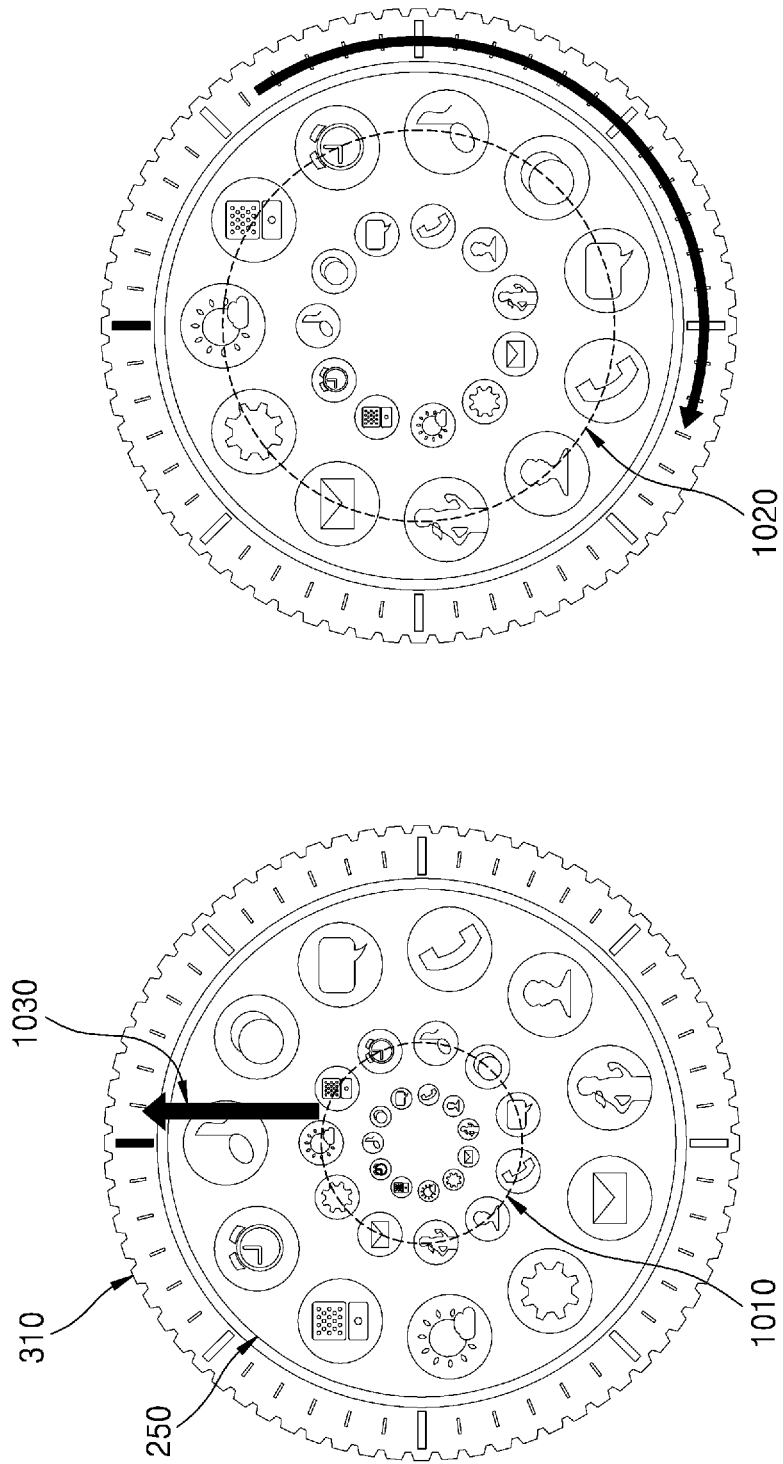
FIG. 10 is a diagram of an example of searching for icons in concentric circles based on a dynamic interaction on a wearable device, according to an embodiment.

FIG. 10 is a diagram of an example of searching for icons in concentric circles based on a dynamic interaction on the wearable device 200, according to an embodiment.

Referring to FIG. 10, three virtual closed loops may be displayed on the display 250 of the wearable device 200. The user of the wearable device 200 may zoom-in on the icons arranged along a virtual closed loop close to the center of the display 250 to be arranged along a virtual closed loop that is far from the center of the display 250 through a swipe gesture. When the zoom-in operation is made to navigate the plurality of icons arranged along a second virtual closed loop 1010, the user of the wearable device 200 may perform a swipe gesture 1030 outwardly from the center of the display 250.

Through the outward swipe gesture, the application icons arranged along the second virtual closed loop 1010 may be arranged along a third virtual closed loop 1020 on a circumference of the display 250. The user of the wearable device 200 may rotate the bezel ring 310 in order to select the plurality of application icons arranged along the third virtual closed loop 1020.

Figure 11:
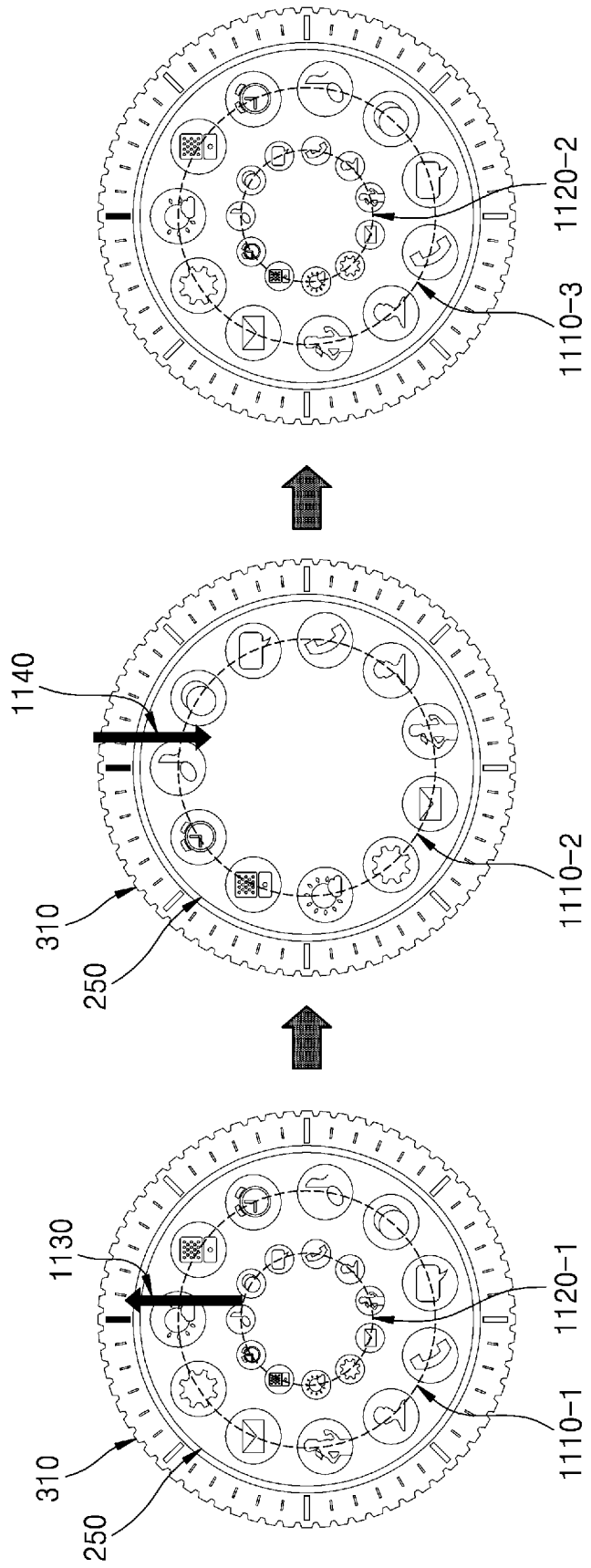
FIG. 11 is a diagram of an example of searching for icons in concentric circles based on a plurality of dynamic interactions on a wearable device, according to an embodiment.

FIG. 11 is a diagram of an example of searching for icons in concentric circles based on a plurality of dynamic interactions on the wearable device 200, according to an embodiment.

Referring to FIG. 11, three virtual closed loops may be displayed on the display 250 of the wearable device 200. The user of the wearable device 200 may perform the zoom-in operation for navigating the plurality of icons arranged along a second virtual closed loop 1120-1. The user of the wearable device 200 may perform an outward swipe gesture 1130 from the center of the display 250. Through the outward swipe gesture 1130 from the center of the display 250, the application icons arranged along the second virtual closed loop 1120-1 may be arranged along a third virtual closed loop 1110-2 on the circumference of the display 250.

The user of the wearable device 200 may perform the zoom-out operation in order to return to the original state. The user of the wearable device 200 may perform an inward swipe gesture 1140 from an outer portion of the center of the display 250. Through the inward swipe gesture 1140 from the outer portion of the center of the display 250, the application icons arranged along the third virtual closed loop 1110-2 on the circumference of the display 250 may be arranged along the second virtual closed loop 1120-2 close to the center of the display 250.

Also, the application icons arranged along the third virtual closed loop 1110-1 may disappear from the display 250 due to the outward swipe gesture 1130 from the center of the display 250. After that, due to the inward swipe gesture 1140 from the outer portion of the center of the display 250, the application icons that have been arranged along the third virtual closed loop 1110-1 may be arranged along a third virtual closed loop 1110-3.

The application icons arranged along the virtual closed loops may be navigated by using a combination of the display 250, the bezel ring 310, the crown of the wearable device 200, physical buttons of the wearable device 200, and gesture with an inertial measurement unit (IMU) based on the rotation of the bezel ring 310, or a combination of an input from a second device such as the bezel ring 310 with the rotation of the bezel ring 310.

FIG. 12 is a diagram of examples of a pressing mechanism and a squeezing mechanism for executing various functions of the wearable device 200, according to an embodiment.

Referring to FIG. 12, when pressure is applied to the bezel ring 310 of the wearable device 200, the bezel ring 310 may be pressed. The pressing may be performed by applying pressure towards a lower end of the bezel ring 310. Here, the pressure may be measured by pressure sensors, and the pressure measured by a pressure sensor may be determined according to the pressure applied to the bezel ring 310. The user of the wearable device 200 may implement a pressing mechanism 1210 by pressing the bezel ring 310.

Also, when the pressure is applied towards a side surface of the bezel ring 310 of the wearable device 200, the bezel ring 310 may be squeezed. The squeezing may denote applying of the pressure towards the side surface of the bezel ring 310 or applying of the pressure towards the inside of the bezel ring 310 from opposite ends of the bezel ring 310. Here, the pressure may be measured by pressure sensors arranged on an outer portion of a dial housing, and various functions may be performed on the wearable device 200 based on the pressure applied to the bezel ring 310. The user of the wearable device 200 may implement a squeezing mechanism 1220 by applying pressure towards the side surface of the bezel ring 310.

Figure 13:
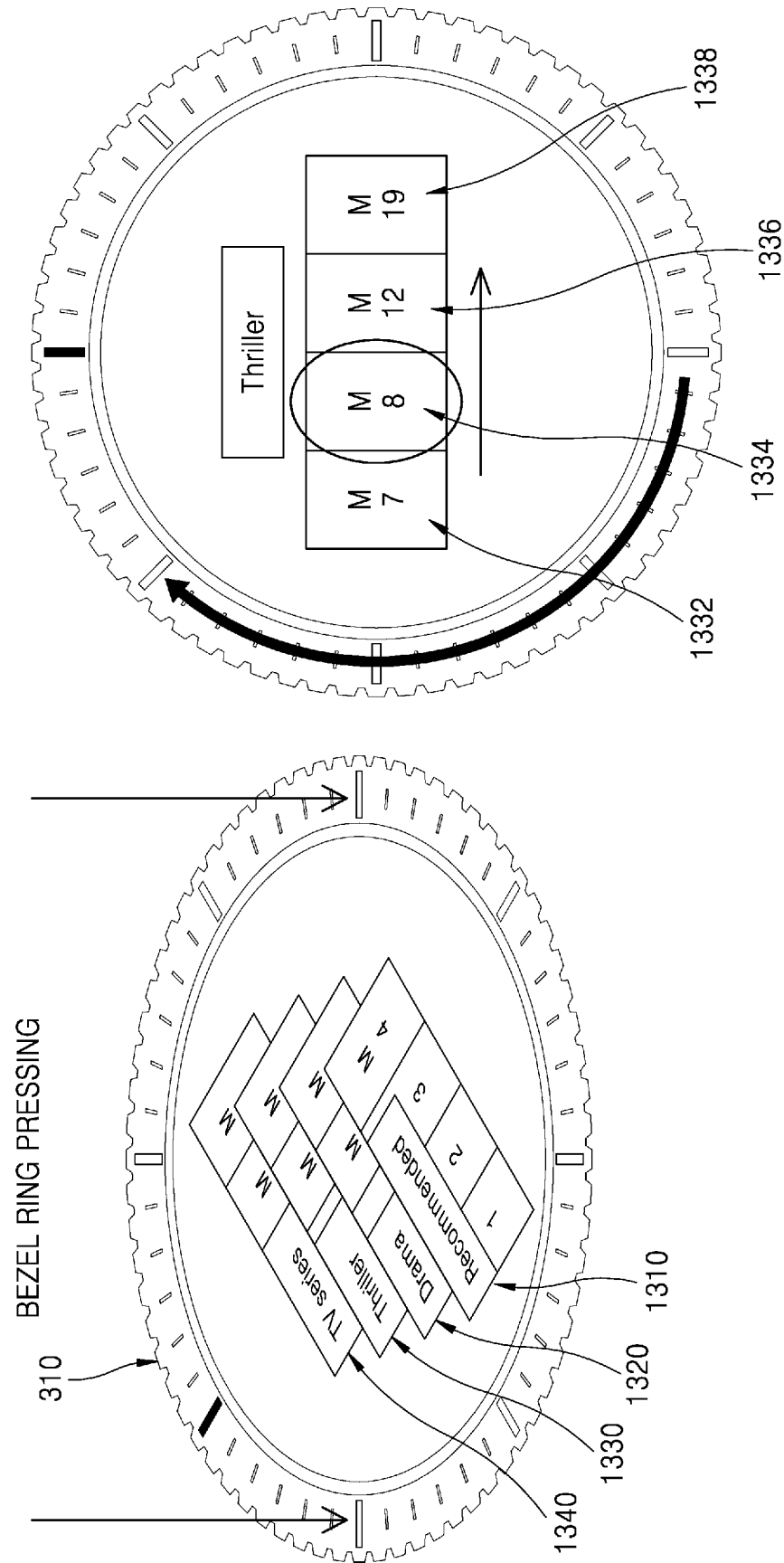
FIG. 13 is a diagram of an example of an operation for selecting content in a wearable device, according to an embodiment.

FIG. 13 is a diagram of an example of an operation for selecting content in the wearable device 200, according to an embodiment Referring to FIG. 13, the user of the wearable device 200 may watch a movie via a movie-related application. Movies from the movie-related application may be displayed based on categories such as recommended, thriller, comedy, drama, TV series, etc. The movies may be displayed on the display 250 of the wearable device 200, based on the categories such as recommended 1310, drama 1320, thriller 1330, and TV series 1340. The user of the wearable device 200 may push the bezel ring 310 for selecting a movie to watch. The user of the wearable device 200 may push the bezel ring 310 downward in order to watch a movie from the thriller 1330 category.

Through the user's pressing operation to the bezel ring 310, the movies included in the category of the thriller 1330 may be displayed on the display 250 of the wearable device 200. Thriller movies may be expressed as combinations of an abbreviation M for movie and numbers. Thriller movies may be expressed as M7 (1332), M8 (1334), M12 (1336), and M19 (1338).

The user of the wearable device 200 may rotate the bezel ring 310 in order to select one of content corresponding to the selected category. The user of the wearable device 200 may rotate the bezel ring 310 of the wearable device 200 in order to navigate a plurality of movies in the selected category of the thriller 1330. When the bezel ring 310 is rotated in the clockwise direction, the thriller movies may be navigated in a direction from M7 (1332) to M19 (1338). The user of the wearable device 200 may select the movie M8 (1334) through the rotation of the bezel ring 310. As shown in FIG. 13, the user of the wearable device 200 may perform combinations of the rotation of the bezel ring 310 with the pressing or squeezing of the bezel ring 310.

Figure 14:
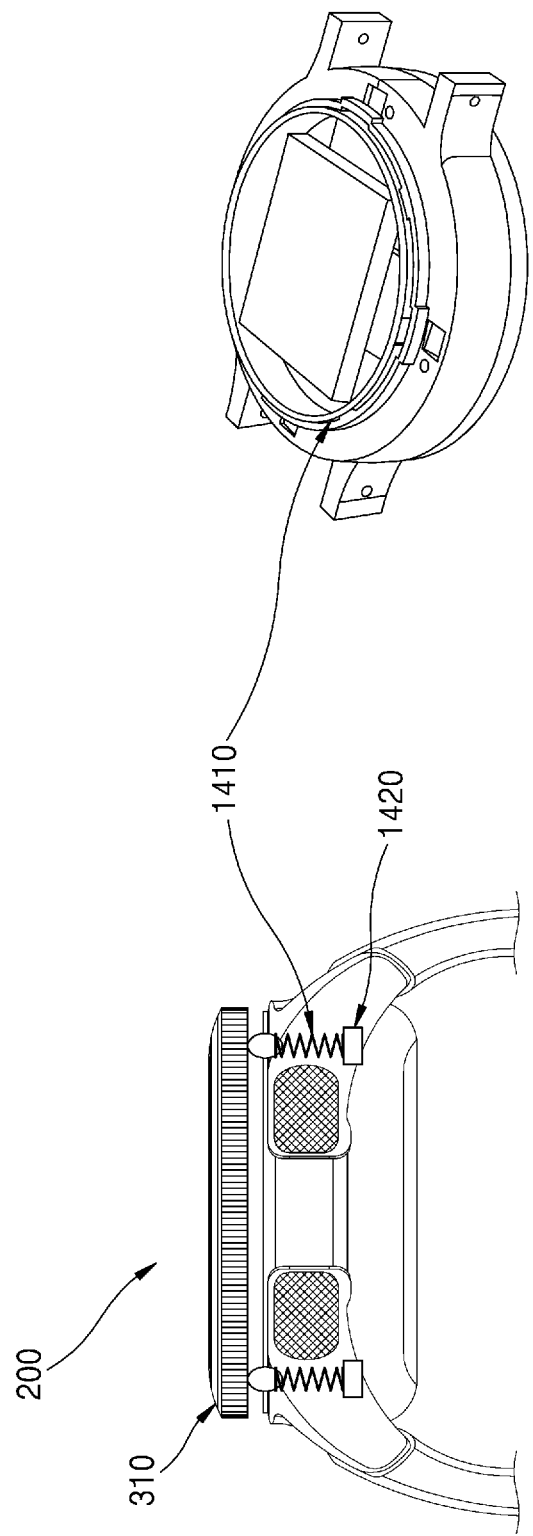
FIG. 14 is a diagram of sensors used to execute a sensing mechanism of a wearable device, according to an embodiment.

FIG. 14 is a diagram of sensors used to execute a sensing mechanism of the wearable device 200, according to an embodiment.

Referring to FIG. 14, the wearable device 200 may include the bezel ring 310 and a dial. The bezel ring 310 of the wearable device 200 may be pressed downward in order to perform operations on the wearable device 200. Here, springs 1410 may be provided under the bezel ring 310. The movement of the bezel ring 310 may be caused by the springs 1410.

In order to measure the pressure applied by the user of the wearable device 200 while the bezel ring 310 is pressed, a pressure sensor 1420 may be arranged between the springs 1410. The pressure applied by the user may be measured by using the pressure sensor 1420. The pressure applied by the user may be related to certain functions of the wearable device 200. When the pressure applied by the user to the bezel ring 310 is equal to or greater than a first critical value, a first operation of the wearable device 200 may be performed, and when the pressure applied by the user to the bezel ring 310 is equal to or greater than a second critical value that is greater than the first critical value, a second operation of the wearable device 200 may be performed. The first critical value and the second critical value may be determined in advance in units of pressure (e.g., Pa or $N/m^2$).

Not all the elements shown in FIG. 14 are essential elements of the wearable device 200. The wearable device 200 may include more or less elements than those shown in FIG. 14.

Figure 15:
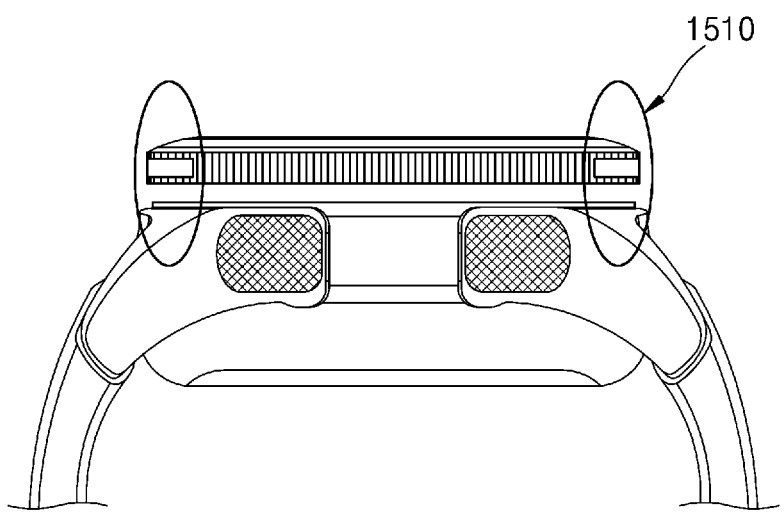
FIG. 15 is a diagram of a pressure sensor in a wearable device, according to an embodiment.

FIG. 15 is a diagram of a pressure sensor 1510 in the wearable device, 200 according to an embodiment.

Referring to FIG. 15, the user of the wearable device 200 may perform operations on the wearable device 200 by squeezing the bezel ring 310 of the wearable device 200. The pressure sensor 1510 may be arranged in or outside of the bezel ring 310 in order to detect a side squeezing pressure with respect to the bezel ring 310. The pressure applied by the user of the wearable device 200 may be measured by the pressure sensor 1510. The pressure applied by the user may be related to certain functions of the wearable device 200. When the pressure applied by the user to the bezel ring 310 is equal to or greater than a first critical value, a first operation of the wearable device 200 may be performed, and when the pressure applied by the user to the bezel ring 310 is equal to or greater than a second critical value that is greater than the first critical value, a second operation of the wearable device 200 may be performed. The first critical value and the second critical value may be determined in advance in units of pressure (e.g., Pa or $N/m^2$).

Not all the elements shown in FIG. 15 are essential elements of the wearable device 200. The wearable device 200 may include more or less elements than those shown in FIG. 15.

Figure 16:
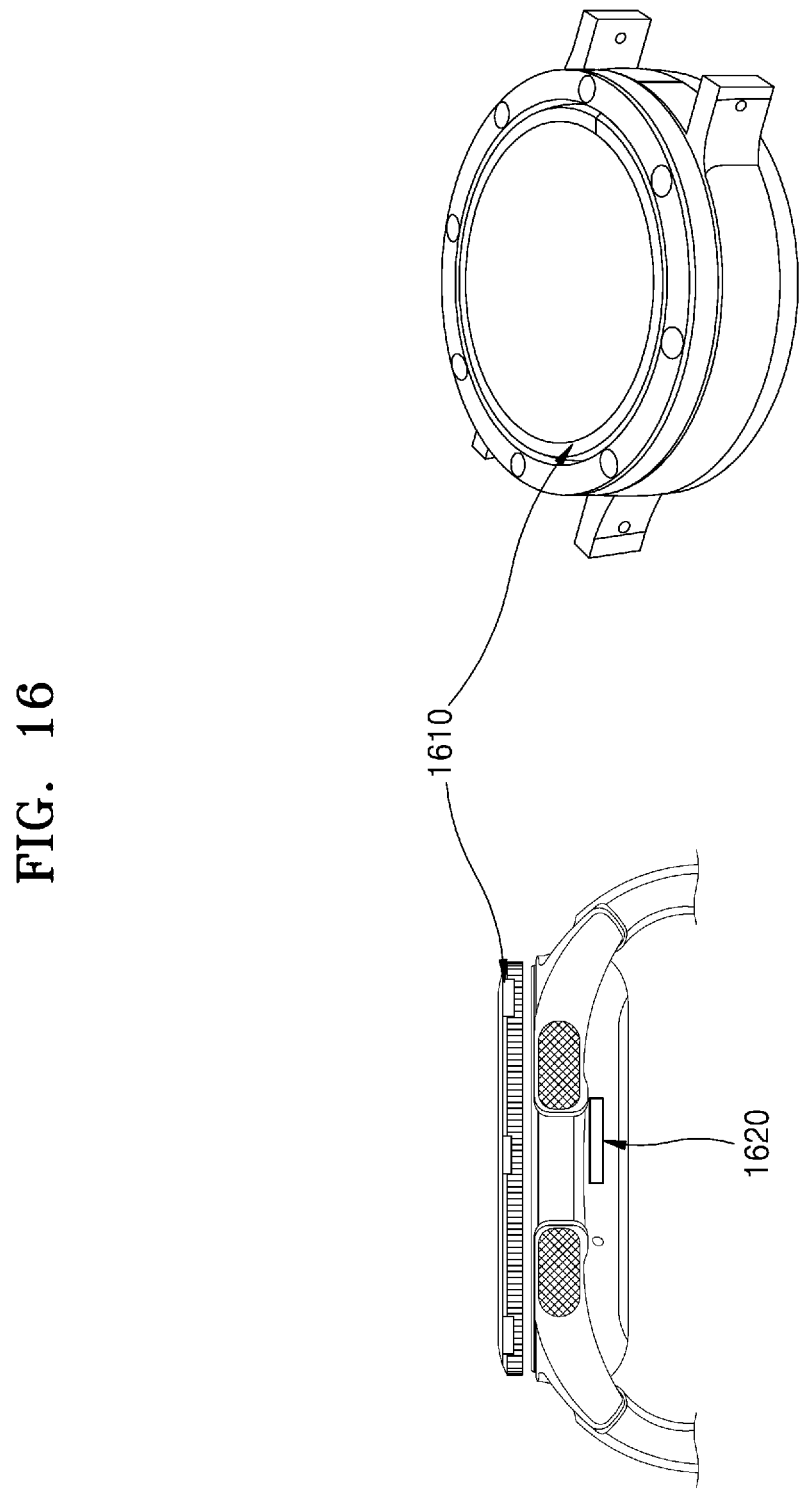
FIG. 16 is a diagram of a magnetic sensor of a wearable device, according to an embodiment.

FIG. 16 is a diagram of a magnetic sensor 1610 of the wearable device 200, according to an embodiment.

Referring to FIG. 16, the bezel ring 310 of the wearable device 200 may include a plurality of magnetic sensors 1610. The plurality of magnetic sensors 1610 may include Hall Effect sensors or magnets. The plurality of magnetic sensors 1610 may be embedded in the bezel ring 310 and may be used to detect a tiny movement of the bezel ring 310 that is less than a critical value. Also, a magnetometer may be arranged in a case of the wearable device 200 in order to measure a magnetic force related to a movement of the bezel ring 310 that is less than the critical value. The magnetic force may be related to various functions performed on the wearable device 200. When the magnetic force with respect to the bezel ring 310 is equal to or greater than a third critical value, a third operation of the wearable device 200 may be performed, and when the magnetic force with respect to the bezel ring 310 may be equal to or greater than a fourth critical value that is greater than the third critical value, a fourth operation of the wearable device 200 may be performed. The third critical value and the fourth critical value may be determined in advance in units of magnetic force (e.g., N).

Not all the elements shown in FIG. 16 are essential elements of the wearable device 200. The wearable device 200 may include more or less elements than those shown in FIG. 16.

Figure 17:
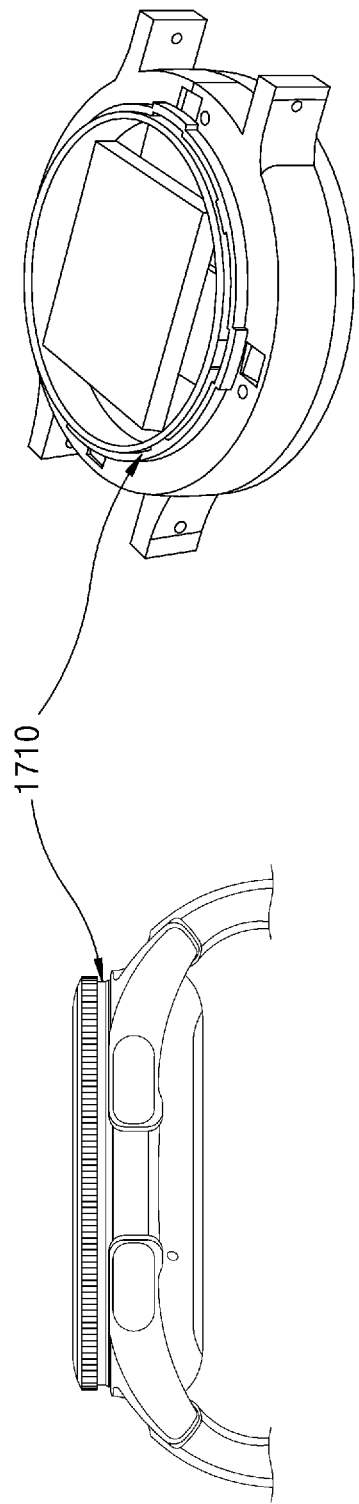
FIG. 17 is a diagram of a capacitive sensor of a wearable device according to an embodiment of the disclosure.

FIG. 17 is a diagram of a capacitive sensor 1710 of the wearable device 200, according to an embodiment.

Referring to FIG. 17, a plurality of capacitive sensors 1710 may be included in the wearable device 200 in order to detect a variation in a capacitance based on the movement of the bezel ring 310 of the wearable device 200. The plurality of capacitive sensors 1710 may be arranged along an inner periphery of the dial of the wearable device 200. The plurality of capacitive sensors 1710 may detect the movement of the bezel ring 310 within a range of a sub-millimeter unit.

Not all the elements shown in FIG. 17 are essential elements of the wearable device 200. The wearable device 200 may include more or less elements than those shown in FIG. 17.

Figure 18:
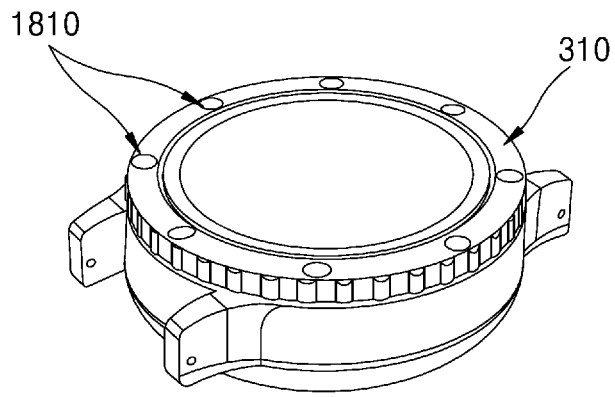
FIG. 18 is a diagram of a wearable device, according to an embodiment.

FIG. 18 is a diagram of the wearable device 200, according to an embodiment.

Referring to FIG. 18, the wearable device 200 may include the display 250 for displaying information to the user, the bezel ring 310 including a plurality of magnets embedded therein, a dial of the wearable device 200, a plurality of springs on an outer periphery of the dial, and a plurality of pressure sensors arranged among the plurality of springs. Not all the elements shown in FIG. 18 are essential elements of the wearable device 200. The wearable device 200 may include more or less elements than those shown in FIG. 18.

The dial of the wearable device 200 may include the outer periphery for arranging the plurality of springs, and an inner periphery for housing inertial sensors at predetermined locations. Also, the plurality of springs may be arranged on the outer periphery of the dial of the wearable device 200.

The bezel ring 310 may include the plurality of magnetic sensors 1810 for detecting an extremely small movement of the bezel ring 310, where the extremely small movement is equal to or less than a critical value. The bezel ring 310 may be configured to support various operations such as a rotation of the dial, pressing, or squeezing of the dial of the wearable device 200, for allowing one or more operations to be performed on the wearable device 200.

FIG. 19 is a diagram of the wearable device 200, according to an embodiment.

Referring to FIG. 19, the cross-sectional view shows a configuration of the wearable device 200. The wearable device 200 may include the bezel ring 310, a cover glass 1910, an inner ring 1920, a dial 1930, and pressure sensors 1940. The wearable device 200 may include the dial 1930 for assembling with other elements such as various sensors and the bezel ring 310. The pressure sensors 1940 may be arranged on an outer portion of the housing of the dial 1930. The pressure sensors 1940 arranged on the outer portion of the housing of the dial 1930 may sense an increase in the pressure, when the inner ring 1920 of the bezel ring 310 is squeezed and the pressure is applied to the dial 1930 (i.e., when the dial 1930 is pushed).

When the bezel ring 310 is squeezed, a capacitance between the bezel ring 310 and the housing of the dial 1930 may be changed. Here, the change in the capacitance may be detected and used to perform the zoom-in or zoom-out operation with respect to the concentric circles or virtual closed loops displayed on the display 250 of the wearable device 200.

Figure 20:
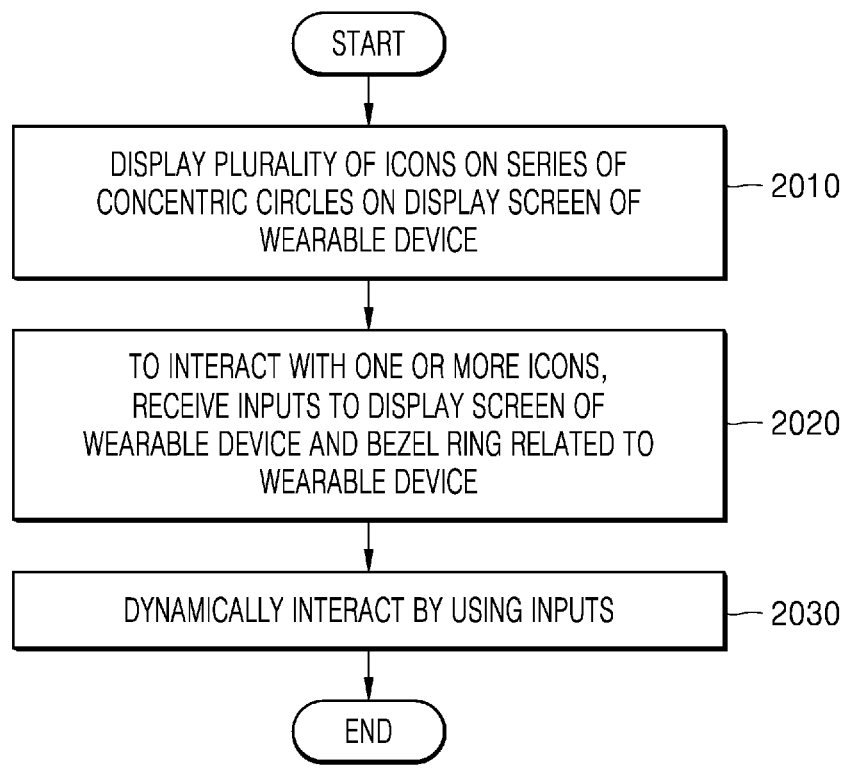
FIG. 20 is a flowchart of an operating method for interacting with a wearable device, according to an embodiment.

FIG. 20 is a flowchart an operating method for interacting with the wearable device 200, according to an embodiment.

Referring to FIG. 20, at step 2010, the wearable device 200 may display a plurality of icons on a series of concentric circles displayed on a display screen of the wearable device 200. The display 250 of the wearable device 200 may display a plurality of icons along the series of concentric circles on the display screen. The series of concentric circles may denote one or more virtual closed loops that are arranged away from the center of the display 250. The display screen may denote a screen of the display 250.

At step 2020, in order to interact with one or more icons, the wearable device 200 may receive inputs with respect to the display screen of the wearable device 200, the bezel ring 310 related to the wearable device 200, etc. In order to interact with one or more icons, the wearable device 200 may receive at least one input with respect to the display screen and the bezel ring 310. The input to the display screen may include a swipe gesture, a tap gesture, or a drag gesture with respect to the display screen. Here, the swipe gesture may include an outward swipe gesture from the center of the display screen or an inward swipe gesture from the outer portion of the display screen. Also, the input to the bezel ring 310 may include a squeezing, a pressing, or a rotation input with respect to the bezel ring.

At step 2030, the wearable device 200 may dynamically interact by using the inputs. The interaction engine 220 of the wearable device 200 shown in FIG. 2 may dynamically interact with one or more icons or one or more functions associated with the one or more icons by using the one or more inputs to the wearable device 200. The wearable device 200 may perform the zoom-in or zoom-out operation of the displayed icons and select one or more icons among the plurality of icons, by using the swipe gesture, tap gesture, or drag gesture on the display screen of the wearable device 200 or the squeezing, pressing, or the rotation input to the bezel ring 310.

In the disclosure, various operations, actions, blocks, or steps may be performed in different orders or simultaneously. Also, without departing from the scope of the disclosure, some of the operations, actions, blocks, or steps may be omitted, added, modified, or skipped in some embodiments of the disclosure.

Figure 21:
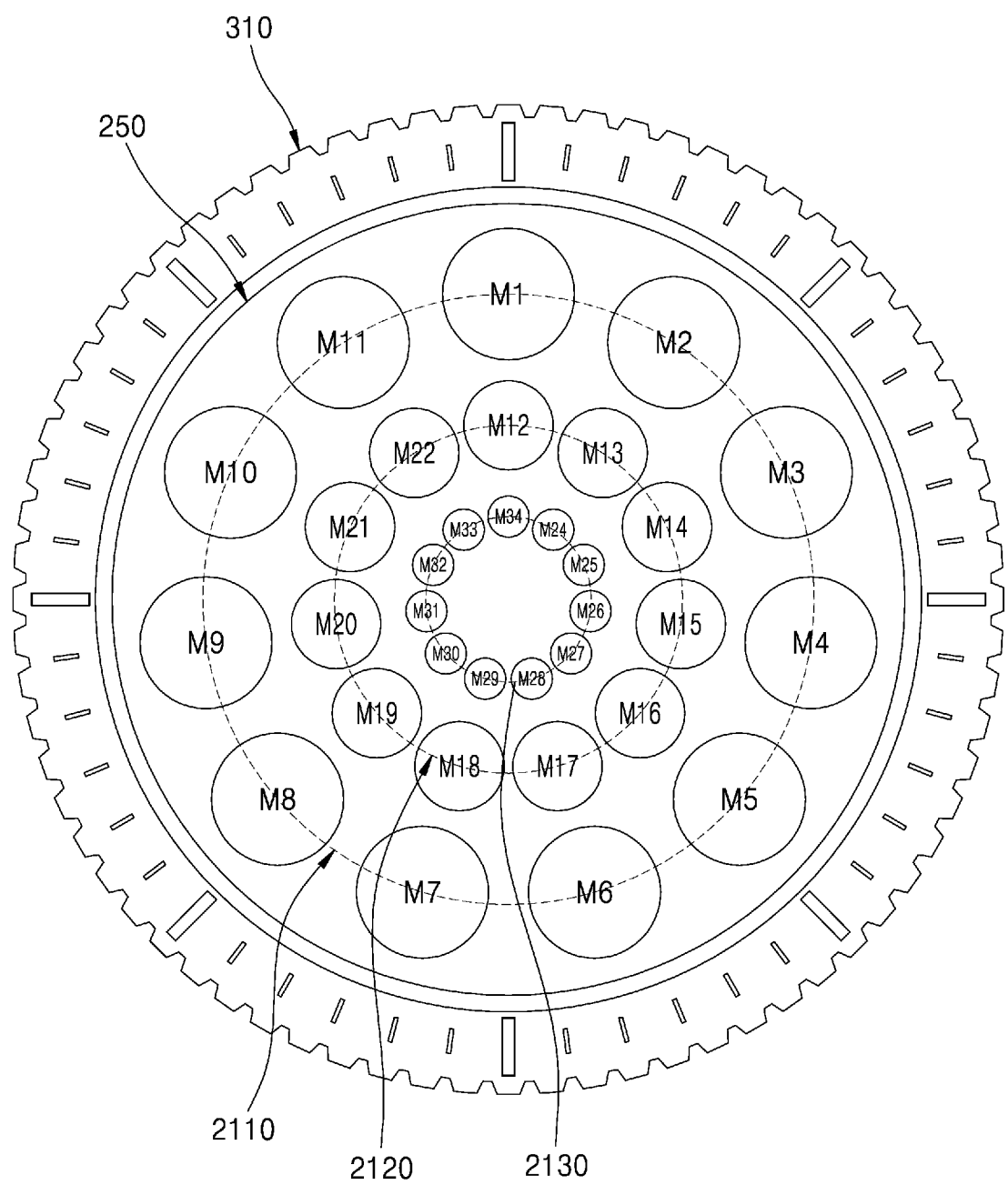
FIG. 21 is a diagram of an example of displaying icons related to music in concentric circles on a wearable device, according to an embodiment.

FIG. 21 is a diagram of an example of displaying icons related to music in concentric circles on the wearable device 200, according to an embodiment. However, the embodiments of the disclosure are not limited to displaying of the icons related to music, but may include displaying of icons regarding arbitrary content.

Referring to FIG. 21, a media application having a multi-layered user interface (UI) displaying a plurality of music tracks may be considered. The media application may include an application related to music. Music tracks stored on the application related to music may be displayed as a series of three concentric circles on a screen of the display 250 of the wearable device 200. The icons indicating the music tracks may be displayed along a first concentric circle 2130, a second concentric circle 2120, and a third concentric circle 2110. The first concentric circle 2130, the second concentric circle 2120, and the third concentric circle 2110 may respectively denote a first virtual closed loop, a second virtual closed loop, and a third virtual closed loop.

Icons indicating the music tracks may be expressed as a combination of letter M and a number. The icons indicating the music tracks may be expressed as M1, M2, M3, etc. The user of the wearable device 200 may navigate the concentric circles by pressing or squeezing the bezel ring 310 of the wearable device 200. The user of the wearable device 200 may navigate internal concentric circles close to the center of the display 250 by pressing or squeezing the bezel ring 310 of the wearable device 200. Also, the user of the wearable device 200 may select a certain music track by rotating the bezel ring 310. The user of the wearable device 200 may navigate the music tracks arranged along the second concentric circle 2120 by pressing or squeezing the bezel ring 310. The music tracks arranged along the second concentric circle 2120 may be displayed along the third concentric circle 2110 on the circumference of the display 250 through the pressing or squeezing of the bezel ring 310.

As shown in FIG. 21, because the icons related to the plurality of music tracks are displayed along the series of concentric circles, navigating and selecting operations of the music tracks stored in the wearable device 200 may be easily performed.

Figure 22:
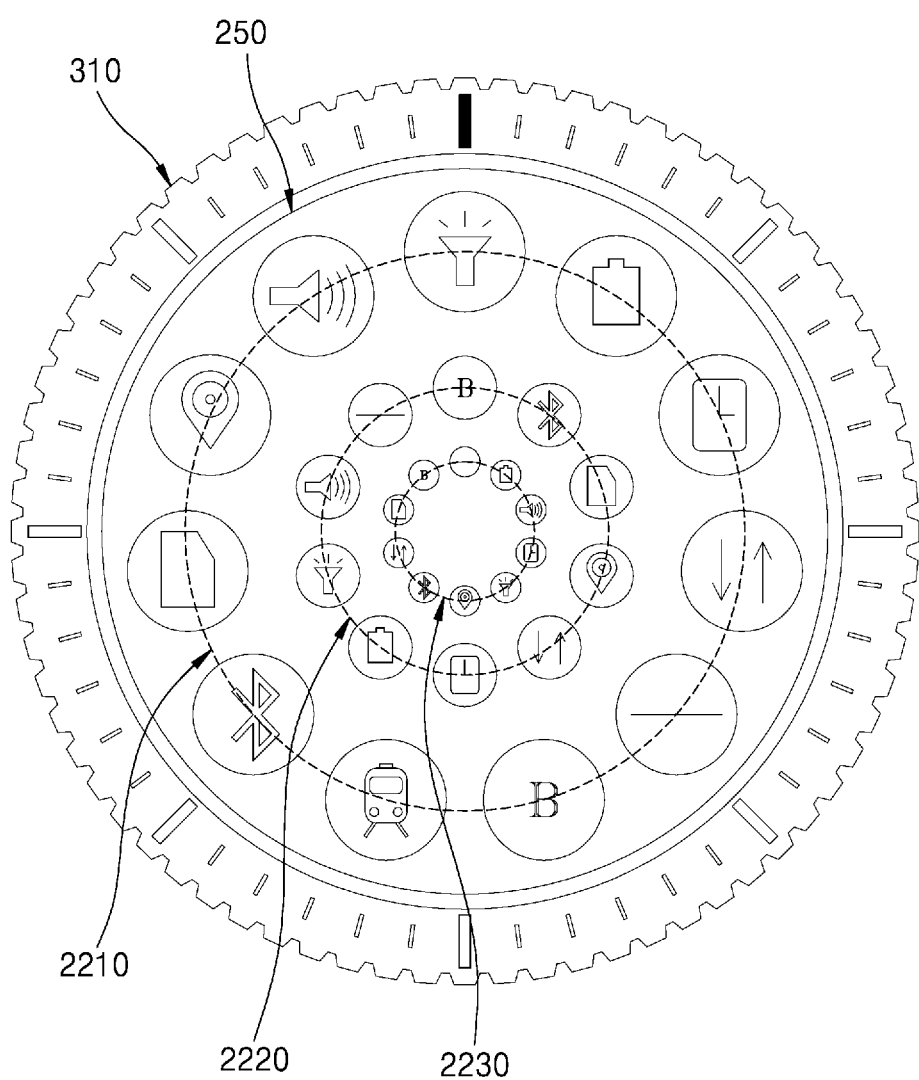
FIG. 22 is a diagram of an example of displaying icons related to settings in concentric circles on a wearable device, according to an embodiment.

FIG. 22 is a diagram of an example of displaying icons related to settings in concentric circles on the wearable device 200, according to an embodiment.

Referring to FIG. 22, a setting-related application having a multi-layered UI representing a plurality of utility functions may be considered. The plurality of utility functions may include a sound adjustment function, a flashlight function, a Bluetooth control function, an airplane mode function, etc., but are not limited thereto.

The plurality of utility functions may be expressed on a series of concentric circles on a screen of the display 250 of the wearable device 200. The icons representing the plurality of utility functions may be displayed along a first concentric circle 2230, a second concentric circle 2220, and a third concentric circle 2210. The first concentric circle 2230, the second concentric circle 2220, and the third concentric circle 2210 may respectively denote a first virtual closed loop, a second virtual closed loop, and a third virtual closed loop.

The user of the wearable device 200 may navigate the concentric circles by pressing or squeezing the bezel ring 310 of the wearable device 200. The user of the wearable device 200 may navigate internal concentric circles close to the center of the display 250 by pressing or squeezing the bezel ring 310 of the wearable device 200. Also, the user of the wearable device 200 may navigate internal concentric circles by performing a swipe gesture or drag gesture with respect to the screen of the display 250. Also, the user of the wearable device 200 may select a certain utility function by rotating the bezel ring 310.

The user of the wearable device 200 may navigate the utility functions arranged along the second concentric circle 2220 by pressing or squeezing the bezel ring 310. The icons indicating the utility functions arranged along the second concentric circle 2220 may be displayed along the third concentric circle 2210 on the circumference of the display 250 through the pressing or squeezing of the bezel ring 310.

As shown in FIG. 22, because the icons related to the plurality of utility functions are displayed along the series of concentric circle, the navigating and selecting operations of the utility functions for controlling the wearable device 200 may be easily performed.

Figure 23:
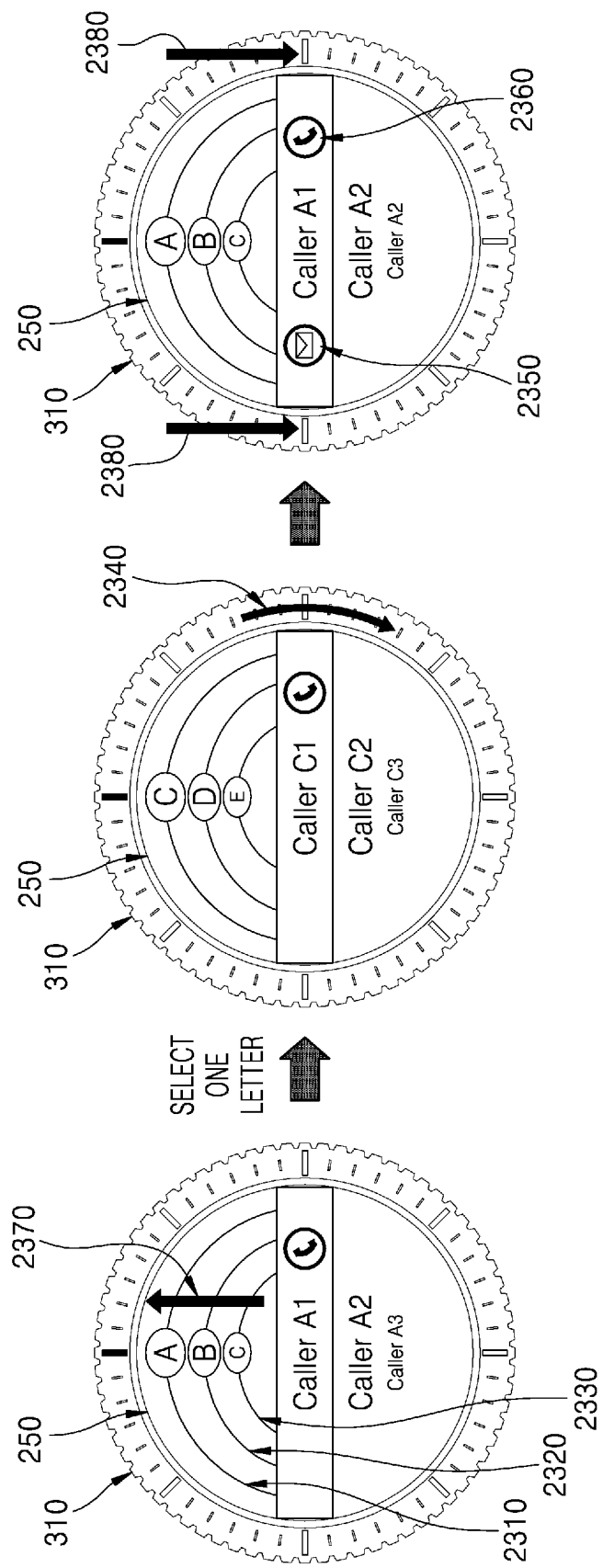
FIG. 23 is a diagram of an example of performing a phone call through a dynamic interaction with a wearable device, according to an embodiment.

FIG. 23 is a diagram of an example of performing a phone call through a dynamic interaction with the wearable device 200, according to an embodiment.

Referring to FIG. 23, the user of the wearable device 200 makes a phone call to a caller C3. A series of concentric circles representing letters of the alphabet related to contacts stored in the wearable device 200 may be displayed on the display 250 of the wearable device 200. A concentric circle 2310 regarding a letter A, a concentric circle 2320 regarding a letter B, and a concentric circle 2330 regarding a letter C may be displayed.

The user of the wearable device 200 may perform a swipe-out gesture 2370 with respect to the series of concentric circles representing the letters related to the contacts stored in the wearable device 200. The swipe-out gesture 2370 may denote an outward swipe gesture from the center of the display 250. Through the swipe-out gesture 2370, the concentric circle 2330 regarding the letter C that is closest to the center of the display 250 may be arranged along the circumference of the display 250. When the concentric circle 2330 regarding the letter C is located at an outermost portion of the display 250, the user of the wearable device 200 may rotate the bezel ring 310 of the wearable device 200 for selecting a caller C3 (2340).

A caller C1 icon, a caller C2 icon, and a caller C3 icon may be sequentially displayed on the display 250 by the rotation of the bezel ring 310. When the caller C3 is selected, the user of the wearable device 200 may select a function to be performed with respect to the caller C3. The user of the wearable device 200 may select one of an icon 2350 regarding a message or an icon 2360 regarding a phone call, on the display 250. The user may press the bezel ring 310 (2380) in order to select the function to be performed with respect to the caller C3. The user of the wearable device 200 may select the function to be performed with respect to the caller C3 by simultaneously pressing opposite sides of the bezel ring 310 in a direction in parallel with the bezel ring 310 or individually pressing a left side or a right side of the bezel ring 310.

Figure 24:
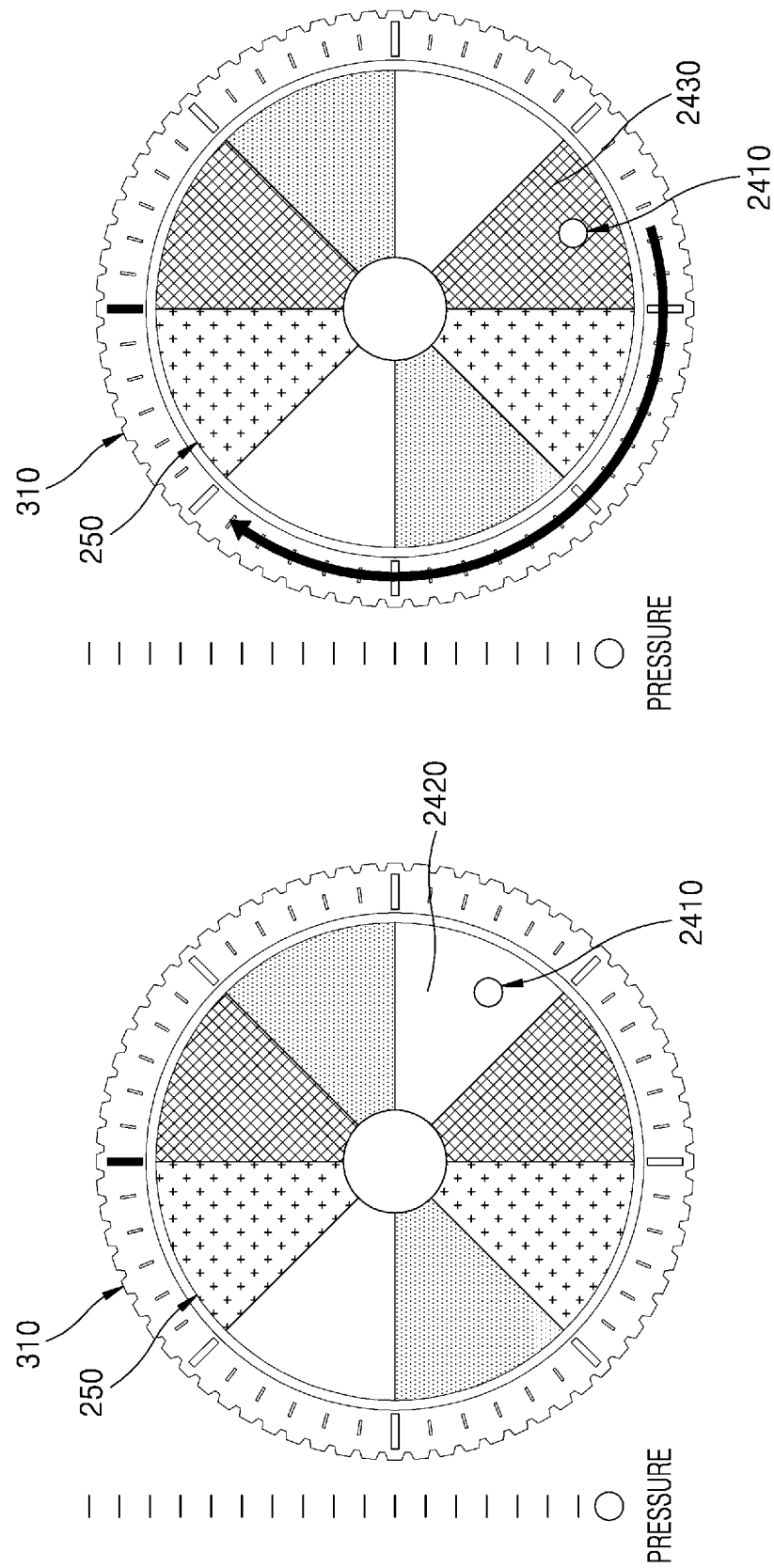
FIG. 24 is a diagram of an example of controlling a drawing application by rotating a bezel ring of a wearable device, according to an embodiment.

FIG. 24 is a diagram of an example of controlling a drawing application by rotating the bezel ring 310 of the wearable device 200, according to an embodiment.

Referring to FIG. 24, a color palette of a drawing application in the wearable device 200 is provided. A color palette representing various colors may be displayed on the display 250 of the wearable device 200. Colors in the color palette may have individual sections respectively corresponding thereto. A color selection indicator 2410 may indicate a color that is currently selected by the user of the wearable device 200. The color selection indicator 2410 may indicate that a first color 2420 is currently selected by the user.

The user of the wearable device 200 may change the selected color by rotating the bezel ring 310 of the wearable device 200. When the user of the wearable device 200 rotates the bezel ring 310, a location of the color selection indicator 2410 may be moved from a section corresponding to the first color 2420 to a section corresponding to a second color 2430. From the first color 2420, the second color 2430 may be selected by movement of the color selection indicator 2410.

Figure 25:
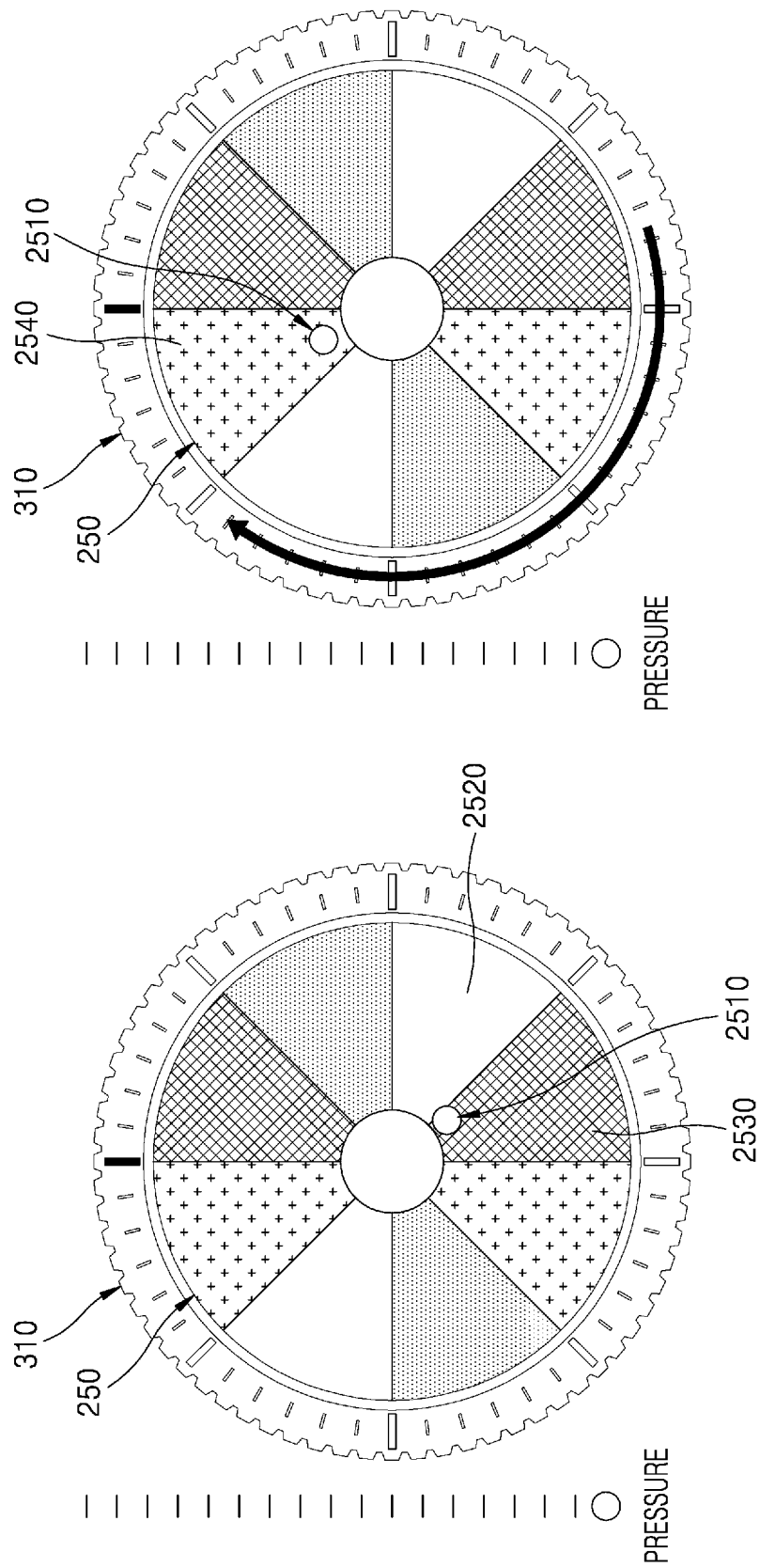
FIG. 25 is a diagram of an example of controlling a drawing application by pressing or rotating a bezel ring of a wearable device, according to an embodiment.

FIG. 25 is a diagram of an example of controlling a drawing application by pressing or rotating the bezel ring 310 of the wearable device 200, according to an embodiment.

Referring to FIG. 25, the user of the wearable device 200 may press the bezel ring 310 in order to move the color selection indicator 2510 radially along the color palette. The color selection indicator 2510 may closer to a boundary of the display 250 than to the center of the display 250. After that, the color selection indicator 2510 may be moved to a location that is closer to the center of the display 250 than the boundary of the display 250, when the bezel ring 310 is pressed.

The pressure applied by the user of the wearable device 200 to the bezel ring 310 may be determined by the pressure sensors included in the bezel ring 310. Based on the pressure applied to the bezel ring 310, the color selection indicator 2510 may move radially along the color palette. Here, the color may be selected according to the movement of the color selection indicator 2510.

When the user of the wearable device 200 wants to select a different color from that of currently selected along a circumference of the color palette, the user may rotate the bezel ring 310. When the user of the wearable device 200 rotates the bezel ring 310, a location of the color selection indicator 2510 may be moved from a section corresponding to the second color 2530 to a section corresponding to a third color 2540. From the second color 2530, the third color 2540 may be selected by movement of the color selection indicator 2510.

In each section corresponding to each color in the color palette, the color may change from the center of the display 250 towards the boundary of the display 250. In a section corresponding to the second color 2530, brightness or saturation of the color may be changed from the center of the display 250 towards the boundary of the display 250. In the section corresponding to the second color, the brightness of the color may increase or decrease from the center towards the boundary of the display 250. Also, in the section corresponding to the second color, the saturation of the color may increase or decrease from the center towards the boundary of the display 250.

In methods and systems according to the related art, selecting of a certain color from the color palette of the drawing application causes occlusion of the color, and thereby an accuracy of selecting a certain color may degrade. Unlike the methods and systems of the related art, according to the method provided by the embodiment of the disclosure, the user may select finer colors by performing various operations with respect to the bezel ring 310 of the wearable device 200.

Figure 26:
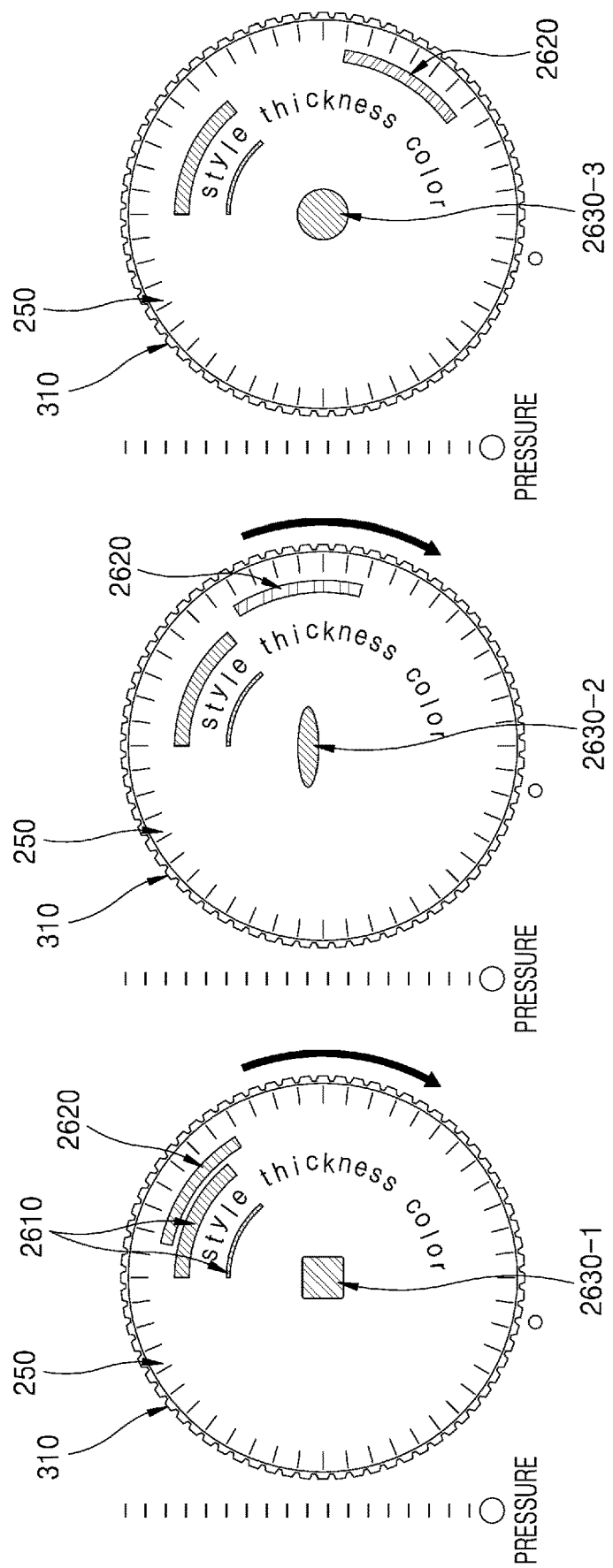
FIG. 26 is a diagram of a first example of controlling a drawing application by squeezing or rotating a bezel ring of a wearable device, according to an embodiment.

FIG. 26 is a diagram of a first example of controlling a drawing application by squeezing or rotating the bezel ring 310 of the wearable device 200, according to an embodiment.

Referring to FIG. 26, a drawing application capable of controlling various functions such as a style, a thickness, or a color of a drawing tool is provided. A first function indicator 2630-1 representing a currently selected function may be displayed on a center of the display 250 of the wearable device 200. The currently selected function may denote a square-shaped style.

When the user of the wearable device 200 wants to select a different style of drawing tool, the user may rotate the bezel ring 310 of the wearable device 200. When the bezel ring 310 is rotated, a second function indicator 2630-2 representing a three-dimensional (3D) flat circle style. Also, when the bezel ring 310 is further rotated, a third function indicator 2630-3 representing a circular shape style.

A function selection indicator 2610 representing a style of the drawing tool and a detailed function selection indicator 2620 may be displayed on the display 250 of the wearable device 200. The function selection indicator 2610 may indicate a style, a thickness, or a color of the drawing tool. Also, the detailed function selection indicator 2620 may indicate a change in the style, in the thickness, or in the color of the drawing tool, with respect to each function selected by the function selection indicator 2610.

When the style of the currently selected drawing tool is a square-shaped style and the user of the wearable device 200 wants to change the style of the drawing tool, the user may change the style of the drawing tool into the 3D flat circle style or circular shaped style by rotating the bezel ring 310 in the clockwise direction or the counter clockwise direction.

Figure 27:
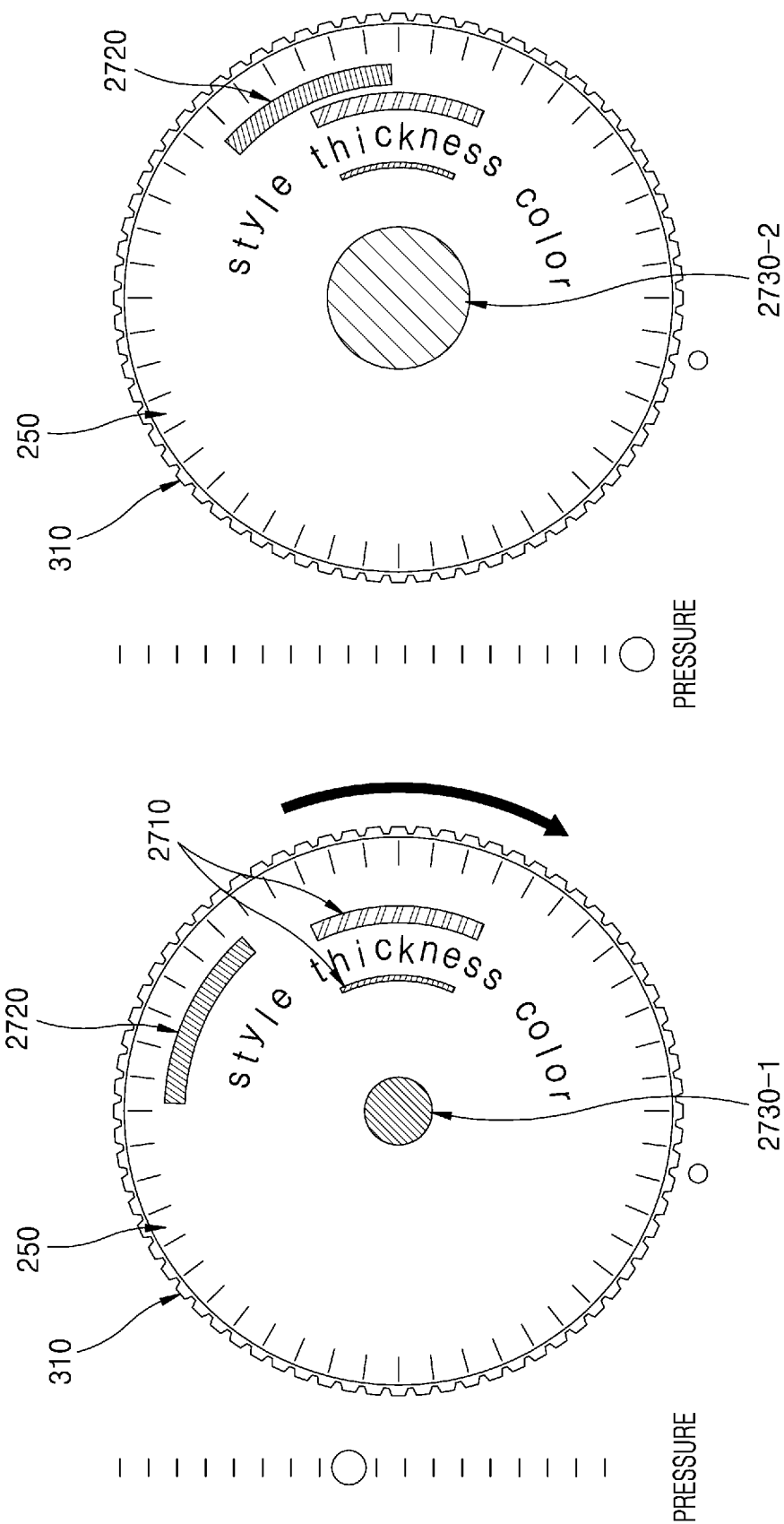
FIG. 27 is a diagram of a second example of controlling a drawing application by squeezing or rotating a bezel ring of a wearable device, according to an embodiment.

FIG. 27 is a diagram of a second example of controlling a drawing application by squeezing or rotating the bezel ring 310 of the wearable device 200, according to an embodiment.

Referring to FIG. 27, in the first example illustrated with reference to FIG. 26, when the user of the wearable device 200 wants to select a different function such as a thickness of the drawing tool, the user may apply a pressure to the bezel ring 310 by pressing or squeezing the bezel ring 310. A thickness control function of the drawing tool may be selected by the pressure applied to the bezel ring 310. The user of the wearable device 200 may change the thickness of the drawing tool by rotating the bezel ring 310.

The user of the wearable device 200 may press or squeeze the bezel ring 310 in order to select the thickness control function from a function for controlling the style of the drawing tool. Due to the pressure applied to the bezel ring 310, a function selection indicator 2710 may be changed from a location of the style control function to a location of the thickness control function. Here, a first function indicator 2730-1 indicating the circular shaped style may not be changed due to the pressure applied to the bezel ring 310.

When the user of the wearable device 200 rotates the bezel ring 310, the detailed function selection indicator 2720 may rotate in a clockwise direction or a counter-clockwise direction. The detailed function selection indicator 2720 may rotate in the clockwise direction. When the detailed function selection indicator 2720 rotates, a function indicator representing the circular shaped style may be changed from the first function indicator 2730-1 to a second function indicator 2730-2. Here, a thickness of the drawing tool indicated by the second function indicator 2730-2 may be greater than that of the drawing tool indicated by the first function indicator 2730-1.

Figure 28:
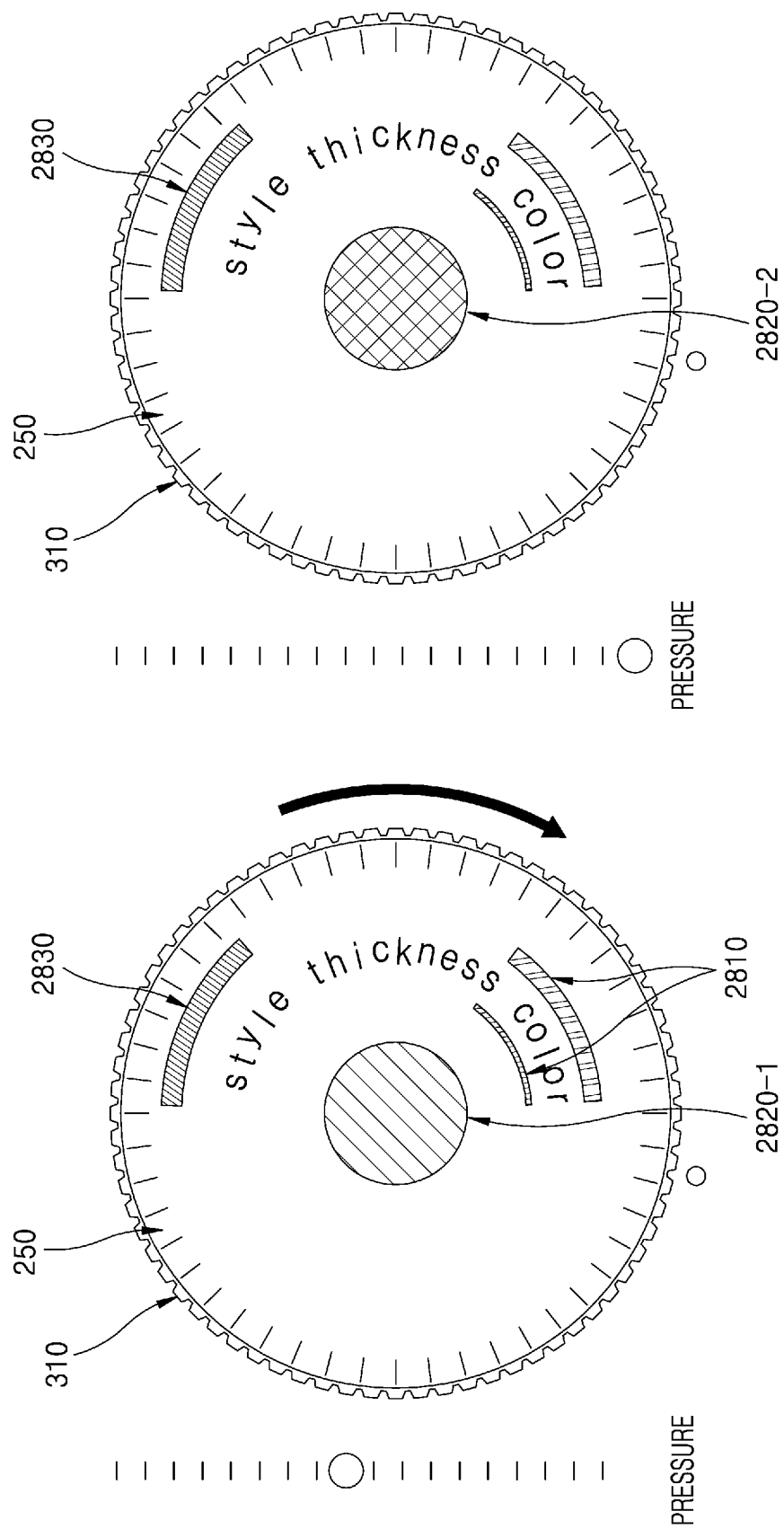
FIG. 28 is a diagram of a third example of controlling a drawing application by squeezing or rotating a bezel ring of a wearable device, according to an embodiment.

FIG. 28 is a diagram of a third example of controlling a drawing application by squeezing or rotating the bezel ring 310 of the wearable device 200, according to an embodiment.

Referring to FIG. 28, in the second example illustrated with reference to FIG. 27, when the user of the wearable device 200 wants to select a different function such as a color of the drawing tool, the user may apply a pressure to the bezel ring 310 by pressing or squeezing the bezel ring 310. A color control function of the drawing tool may be selected by the pressure applied to the bezel ring 310. The user of the wearable device 200 may select a different color from the drawing tool by rotating the bezel ring 310.

An extent of the pressure applied to the bezel ring 310 may correspond to a certain function (e.g., a style, a thickness, or a color) of the drawing tool. Also, an increase in the pressure applied to the bezel ring 310 may allow switching between the functions to be possible. When the user of the wearable device 200 is about to switch from the style function control of the drawing tool to the color control function, the user may apply a greater pressure than that corresponding to the thickness control function to the bezel ring 310 so that the color control function may be directly selected without selecting the thickness control function.

The user of the wearable device 200 may press or squeeze the bezel ring 310 in order to select the color control function from the thickness control function with respect to the drawing tool. Due to the pressure applied to the bezel ring 310, a function selection indicator 2810 may be changed from a location of the thickness control function to a location of the color control function. Here, a first function indicator 2820-1 indicating the circular shaped style may not be changed due to the pressure applied to the bezel ring 310.

When the user of the wearable device 200 rotates the bezel ring 310, the detailed function selection indicator 2830 may rotate in a clockwise direction or a counter-clockwise direction. Also, a length of the detailed function selection indicator 2830 may change. When the detailed function selection indicator 2830 rotates or the length thereof changes, the function indicator indicating color may be changed from a first function indicator 2820-1 indicating a first color to a second function indicator 2820-2 indicating a second color.

In the examples shown in FIGS. 26, 27, and 28, the pressing of the bezel ring 310 of the wearable device 200 may be mapped to a certain function such as a style control function, a thickness control function, or a color control function of the drawing tool. According to an intensity of the pressure applied to the bezel ring 310, the style control function, the thickness control function, or the color control function of the drawing tool may be selected. Also, through the rotation of the bezel ring 310, modifications of the function may be provided in each function. The switching between the functions may be triggered based on time. After a predetermined period has passed, a current function of the drawing tool may be automatically changed to a next function.

Figure 29:
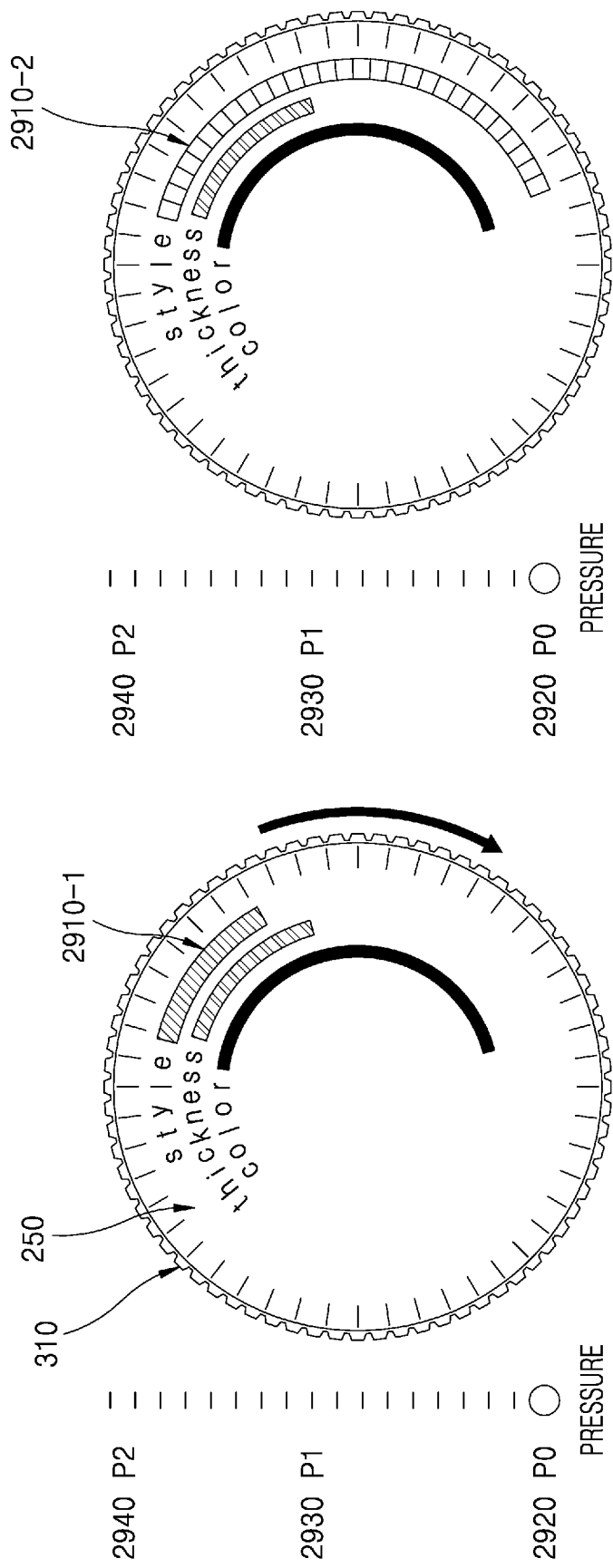
FIG. 29 is a diagram of a fourth example of controlling a drawing application by applying various motions to a bezel ring of a wearable device, according to an embodiment.

FIG. 29 is a diagram of a fourth example of controlling a drawing application by applying various motions to the bezel ring 310 of the wearable device 200, according to an embodiment.

Referring to FIG. 29, the drawing application may have various functions such as a style, thickness, or color control function of the drawing tool. The pressure applied to the bezel ring 310 may be maintained constantly while a certain function is performed. The style control function may correspond to a pressure P0 (2920), a thickness control function may correspond to a pressure P1 (2930), and a color control function may correspond to a pressure P2 (2940). The user of the wearable device 200 may rotate the bezel ring 310 in order to perform various operations in a certain function.

The pressure applied by the user of the wearable device 200 to the bezel ring 310 may be P0 (2920). Here, the pressure P0 (2920) may correspond to the style control function of the drawing tool. When the user wants to perform various functions related to the style control function, the user may rotate the bezel ring 310. Here, the pressure applied to the bezel ring 310 may be maintained at P0 (2920). The user of the wearable device 200 may rotate the bezel ring 310 while maintaining the pressure applied to the bezel ring 310 at P0 (2920). Due to the rotation of the bezel ring 310, a first detailed function selection indicator 2910-1 indicating a first style of the drawing tool may be changed to a second detailed function selection indicator 2910-2 indicating a second style of the drawing tool and may be displayed on the display 250.

Figure 30:
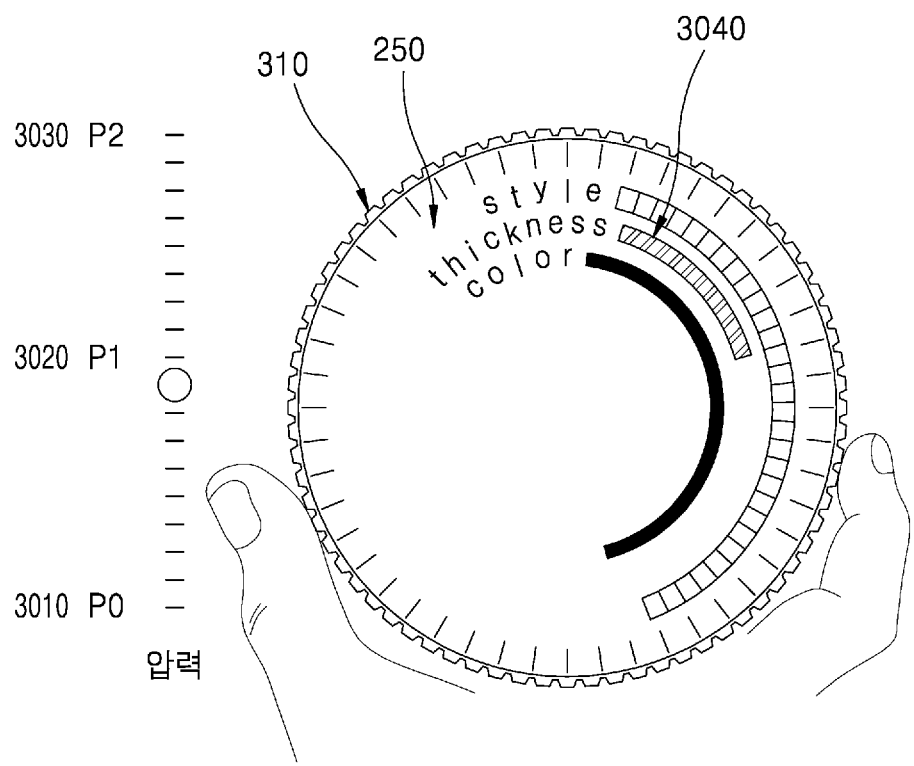
FIG. 30 is a diagram of a fifth example of controlling a drawing application by applying various motions to a bezel ring of a wearable device, according to an embodiment.

FIG. 30 is a diagram of a fifth example of controlling a drawing application by applying various motions to the bezel ring 310 of the wearable device 200, according to an embodiment.

Referring to FIG. 30, the drawing application may have various functions such as a style, thickness, or color control function of the drawing tool. The pressure applied to the bezel ring 310 may be maintained constantly while a certain function is performed. The style control function may correspond to a pressure P0 (3010), a thickness control function may correspond to a pressure P1 (3020), and a color control function may correspond to a pressure P2 (3030). The user of the wearable device 200 may rotate the bezel ring 310 in order to perform various operations in a certain function.

When the user of the wearable device 200 wants to switch between functions of the drawing tool (i.e., when the user wants to switch from the style control function of the drawing tool to the thickness control function of the drawing tool) the user may change the pressure applied to the bezel ring 310. The user of the wearable device 200 may change the pressure applied to the bezel ring 310 from the pressure P0 (3010) corresponding to the style control function to the pressure P1 (3020) corresponding to the thickness control function. When the user wants to perform various functions related to the thickness control function, the user may rotate the bezel ring 310. Here, the pressure applied to the bezel ring 310 may be maintained at P1 (3020). The user of the wearable device 200 may rotate the bezel ring 310 while maintaining the pressure applied to the bezel ring 310 at P1 (3020). Due to the rotation of the bezel ring 310, a third detailed function selection indicator 3040 indicating a first thickness of the drawing tool may be rotated in a clockwise direction or a counter clockwise direction, and a length or thickness of the third detailed function selection indicator 3040 may be changed.

When the user of the wearable device 200 wants to switch the thickness control function to the color control function, the user may change the pressure applied to the bezel ring 310. The user of the wearable device 200 may change the pressure applied to the bezel ring 310 from the pressure P1 (3020) corresponding to the thickness control function to the pressure P2 (3030) corresponding to the color control function.

Figure 31:
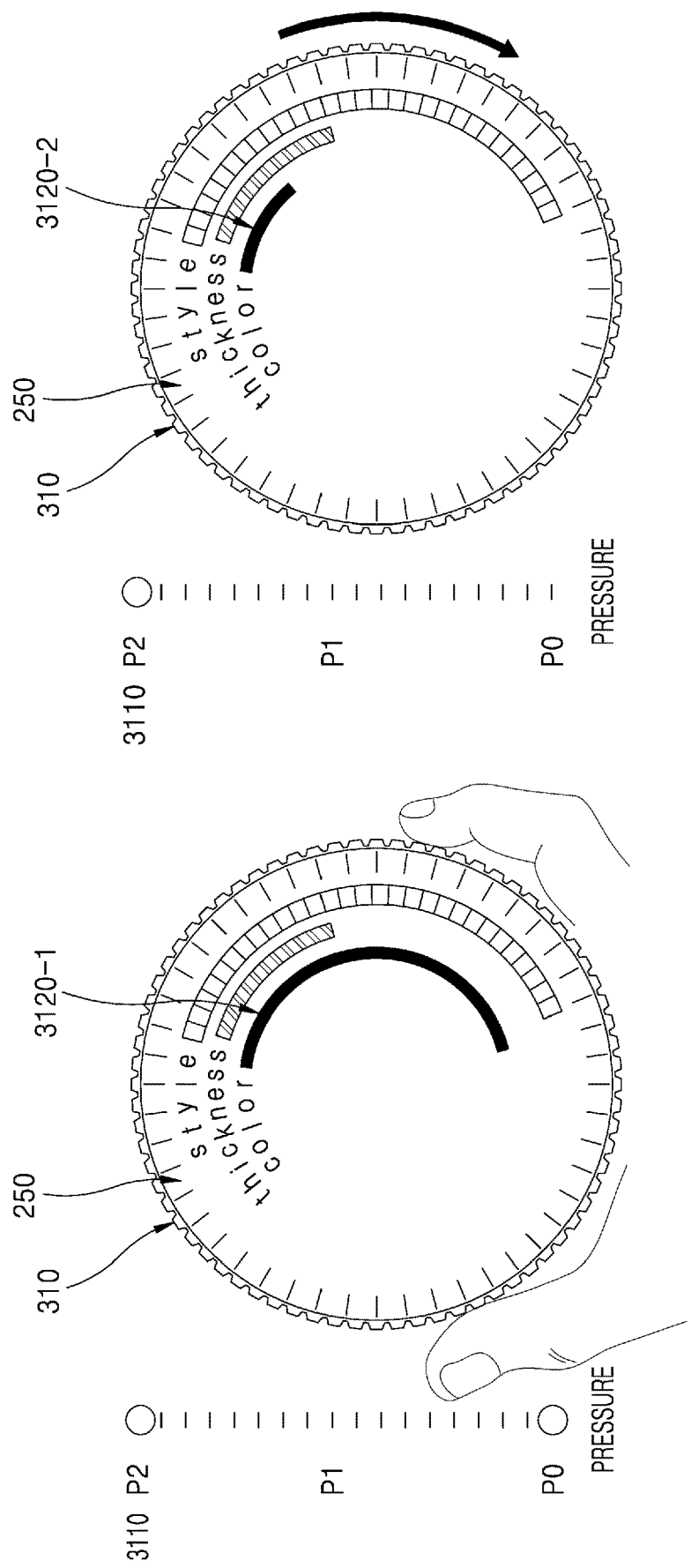
FIG. 31 is a diagram of a sixth example of controlling a drawing application by applying various motions to a bezel ring of a wearable device, according to an embodiment.

FIG. 31 is a diagram of a sixth example of controlling a drawing application by applying various motions to the bezel ring 310 of the wearable device 200, according to an embodiment.

Referring to FIG. 31, when the user of the wearable device 200 wants to perform various operations related to the color control function, the user may rotate the bezel ring 310. Here, the pressure applied to the bezel ring 310 may be maintained at P2 (3110). The user of the wearable device 200 may rotate the bezel ring 310 while maintaining the pressure applied to the bezel ring 310 at P2 (3110). Due to the rotation of the bezel ring 310, a fourth detailed function selection indicator 3140-1 indicating the color of the drawing tool may be rotated in a clockwise direction or a counter clockwise direction, and the length or thickness of the fourth detailed function selection indicator 3140-1 may be changed. The length of the detailed function selection indicator may be changed by the rotation of the bezel ring 310. Due to the rotation of the bezel ring 310, the detailed function selection indicator may be changed from the fourth detailed function selection indicator 3140-1 to a fourth detailed function selection indicator 3140-2 that is shorter than the fourth detailed function selection indicator 3140-1. When the detailed function selection indicator is changed, the color of the drawing tool displayed on the display 250 may be also changed.

In the embodiments illustrated with reference to FIGS. 29, 30, and 31, the rotation of the bezel ring 310 under the given pressure may allow the user of the wearable device 200 to access various functions of the application. Here, the functions may be mapped to the sustained pressure or duration.

Figure 32:
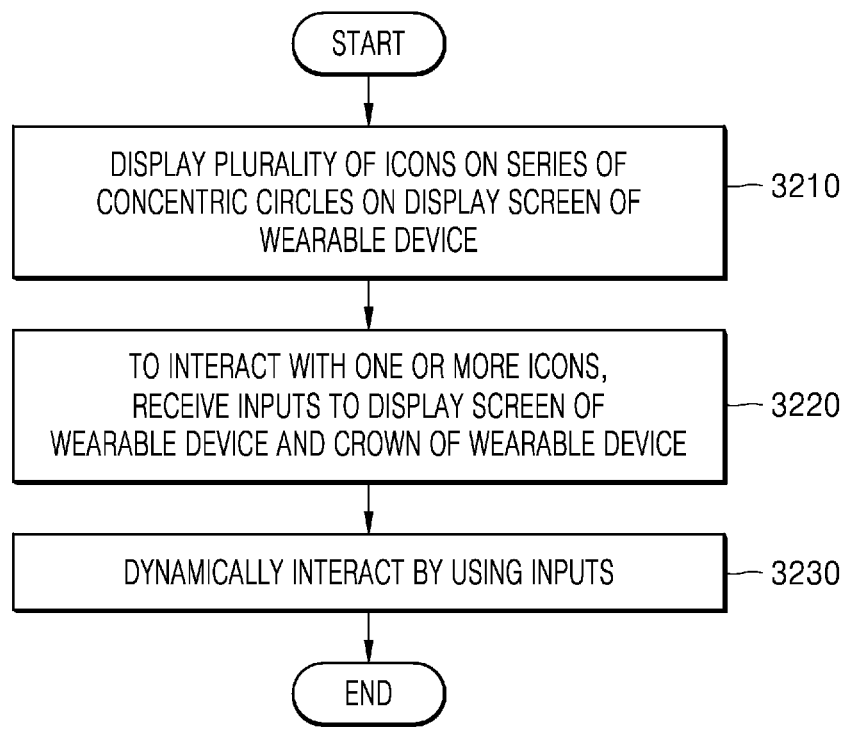
FIG. 32 is a flowchart of an operating method for performing an interaction by using a crown of a wearable device, according to an embodiment.

FIG. 32 is a flowchart an operating method for performing an interaction by using a crown of the wearable device 200, according to an embodiment.

Referring to FIG. 32, at step 3210, the wearable device 200 may display a plurality of icons on a series of concentric circles displayed on a display screen of the wearable device 200. The display 250 of the wearable device 200 may display a plurality of icons along the series of concentric circles on the display screen. The series of concentric circles may denote one or more virtual closed loops that are arranged away from the center of the display 250. The display screen may denote a screen of the display 250.

At step 3220, in order to interact with one or more icons, the wearable device 200 may receive inputs with respect to the display screen of the wearable device 200, the crown of the wearable device 200, etc. The sensor 210 of the wearable device 200 shown in FIG. 2 above may receive inputs to at least one of the display screen or the crown of the wearable device 200 in order to interact with one or more icons.

At step 3230, the wearable device 200 may dynamically interact by using the inputs. The interaction engine 220 of the wearable device 200 shown in FIG. 2 may dynamically interact with one or more icons or one or more functions associated with the one or more icons by using the one or more inputs to the wearable device 200. The wearable device 200 may perform the zoom-in or zoom-out operation of the displayed icons and select one or more icons among the plurality of icons, by using the swipe gesture, tap gesture, or drag gesture on the display screen of the wearable device 200 or the squeezing, pressing, or the rotation of the crown.

Figure 33:
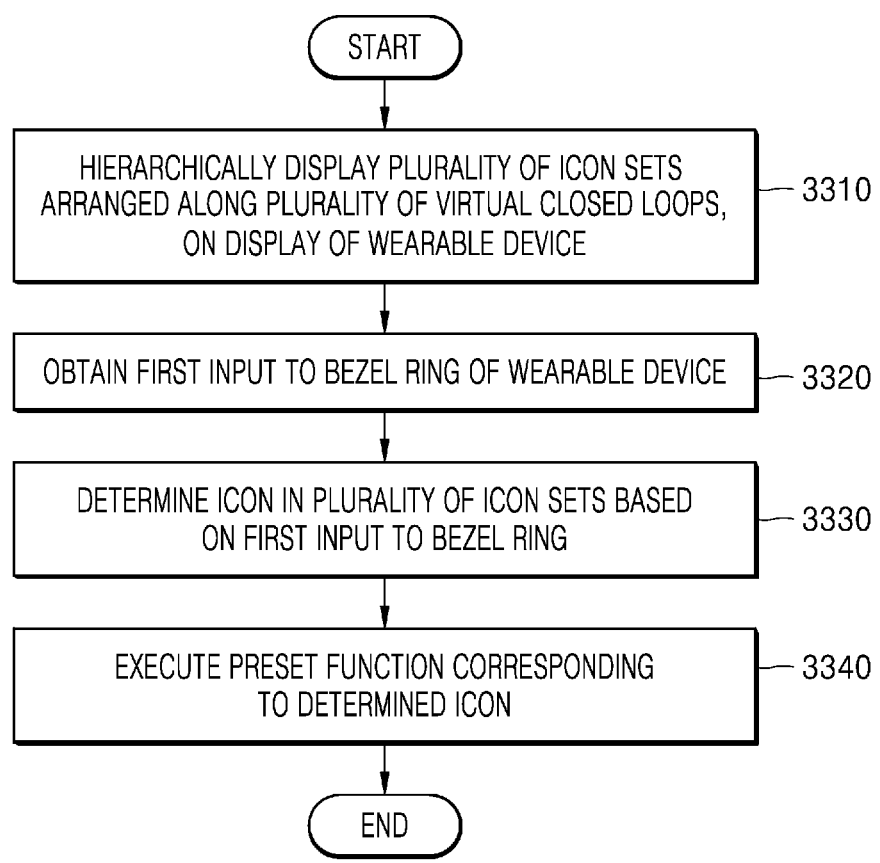
FIG. 33 is a flowchart of a method of operating a wearable device, according to an embodiment.

FIG. 33 is a flowchart a method of operating the wearable device 200 according to an embodiment.

Referring to FIG. 33, at step 3310, the wearable device 200 may hierarchically display a plurality of icon sets arranged along a plurality of virtual closed loops on the display 250 of the wearable device 200. The plurality of virtual closed loops may denote two-dimensional figures having substantially the same centers as one another within a predetermined critical value range. The plurality of virtual closed loops may include, but are not limited to, a first virtual closed loop and a second virtual closed loop. The first virtual closed loop and the second virtual closed loop may denote a first concentric circle and a second concentric circle displayed on the display 250 of the wearable device 200. The plurality of icons sets may include a first icon set arranged along the first virtual closed loop and a second icon set arranged along the second virtual closed loop. The second virtual closed loop may be located within the first virtual closed loop. That is, the second virtual closed loop may be closer to the center of the display 250 than the first virtual closed loop.

At step 3320, the wearable device 200 may obtain a first input to the bezel ring 310 of the wearable device 200. The first input to the bezel ring 310 may denote a pressing, squeezing, or rotation input to the bezel ring 310. However, examples of the first input are not limited thereto.

At step 3330, the wearable device 200 may determine icons included in the plurality of icon sets based on the first input to the bezel ring 310. That is, based on the first input to the bezel ring 310, one of the icons in the first icon set displayed along the boundary of the display 250 may be selected.

The first icon set arranged along the second virtual closed loop described above may be arranged along the first virtual closed loop formed along the boundary of the display 250 by the pressing or squeezing of the bezel ring 310. Arranging of the icon set from the virtual closed loop close to the center of the display 250 onto the virtual closed loop far from the center of the display 250 may be referred to as a zoom-in operation. Also, arranging of the icon set from the virtual closed loop far from the center of the display 250 onto the virtual closed loop close to the center of the display 250 may be referred to as a zoom-out operation. The user of the wearable device 200 may display the icon set through the zoom-in operation and may determine at least one of the icons in the displayed icon set by rotating the bezel ring 310.

Figure 34:
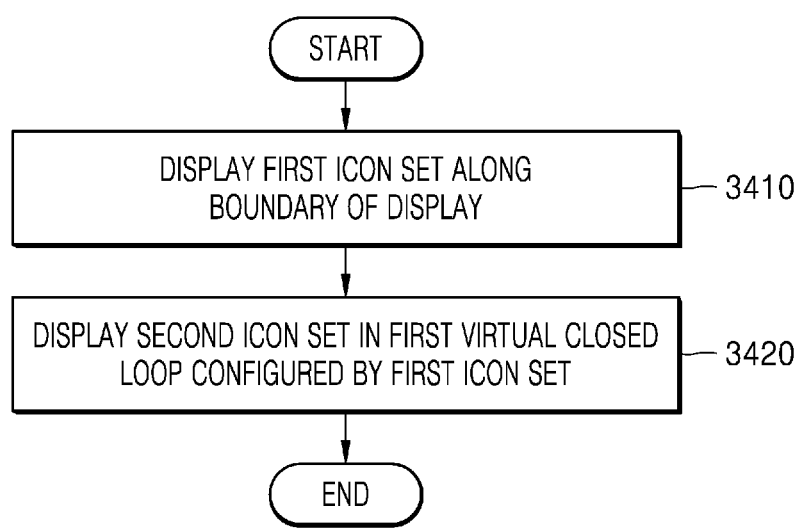
FIG. 34 is a flowchart of a method of operating a wearable device displaying a set of icons, according to an embodiment.

At step 3340, the wearable device 200 may execute a preset function corresponding to the determined icon. When the icon selected by the user of the wearable device 200 is related to a music play application, the wearable device 200 may play music. In addition, when the icon selected by the user of the wearable device 200 is related to a message application, the wearable device 200 may execute the message application. However, examples of the icon are not limited thereto. FIG. 34 below illustrates a method of hierarchically displaying a plurality of icon sets arranged along a plurality of virtual closed loops.

FIG. 34 is a flowchart a method of operating the wearable device 200 displaying a set of icons, according to an embodiment.

Referring to FIG. 34, at step 3410, the wearable device 200 may display a first icon set along a boundary of the display 250. The first icon set related to an application executed on the wearable device 200 may displayed along a first virtual closed loop formed along the boundary of the display 250. The first virtual closed loop may be referred to as a first concentric circle. In addition, a different virtual closed loop may be located inside or outside the first virtual closed loop.

At step 3420, the wearable device 200 may display a second icon set within the first virtual closed loop on which the first icon set is displayed. A second virtual closed loop may be formed in the first virtual closed loop on which the first icon set is arranged. The wearable device 200 may display the second icon set along the second virtual closed loop. Here, icons in the second icon set arranged along the second virtual closed loop may be displayed smaller than those of the first icon set arranged along the first virtual closed loop. The second virtual closed loop may be closer to the center of the display 250 than the first virtual closed loop.

Locations of displaying the first icon set along the first virtual closed loop and displaying the second icon set along the second virtual closed loop on the display 250 may be switched by the pressure applied to the bezel ring 310 of the wearable device 200. The second icon set arranged along the second virtual closed loop may be displayed along the boundary of the display 250 due to a second pressure applied to the bezel ring 310 of the wearable device 200. Here, the first icon set arranged along the first virtual closed loop may be located within a virtual closed loop configured by the second icon set.

As described above, the application icons may be hierarchically displayed on the display 250 of the wearable device 200. The wearable device 200 may receive a user input to devices configuring the wearable device 200, e.g., the display 250, the bezel ring 310, or the crown of the wearable device 200, and may perform operations according to the user input. As such, the user of the wearable device 200 may easily and intuitively access the application icon that the user wants to use, and thus user convenience or user experience may be improved.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

The method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method of operating a wearable device, the method comprising:
   hierarchically displaying each of a plurality of icon sets arranged along each of a plurality of virtual closed loops on a display of the wearable device, the plurality of virtual closed loops comprising a first virtual closed loop and a second virtual closed loop, and the plurality of icon sets comprising a first icon set arranged along the first virtual closed loop and a second icon set arranged along the second virtual closed loop;
   obtaining a first input to a bezel ring of the wearable device;
   displaying the first virtual closed loop and the second virtual closed loop on the display of the wearable device by exchanging a position of the first virtual closed loop and a position of the second virtual closed loop based on the first input to the bezel ring,
   determining at least one icon included in a virtual closed loop arranged along a boundary of the display based on a second input to the bezel ring; and
   executing a preset function corresponding to the determined at least one icon.

2. The method of claim 1, wherein hierarchically displaying each of the plurality of icon sets comprises:
   displaying the first icon set along the boundary of the display; and
   displaying the second icon set in the second virtual closed loop configured by the second icon set, the second virtual closed loop being arranged closer to a center of the display than the first virtual closed loop which is displayed on the boundary of the display.

3. The method of claim 2, wherein icons in the second icon set are displayed smaller than icons in the first icon set.

4. The method of claim 2, wherein determining the at least one icon included in the virtual closed loop arranged along the boundary of the display based on the second input to the bezel ring comprises
   selecting one of the icons in the first icon set arranged along the boundary of the display.

5. The method of claim 4, wherein the first input to the bezel ring or the second input to the bezel ring comprises at least one of a rotation of the bezel ring, a pressing of the bezel ring, or a squeezing of the bezel ring.

6. The method of claim 2, wherein displaying the first virtual closed loop and the second virtual closed loop on the display of the wearable device comprises:

based on the first input to the bezel ring,
displaying the second icon set along the boundary of the display; and
displaying the first icon set in the first closed loop configured by the first icon set,
wherein the first virtual closed loop is arranged closer to the center of the display than the second virtual closed loop which is displayed on the boundary of the display.

7. The method of claim 6, wherein icons in the first icon set are displayed smaller than icons in the second icon set.

8. The method of claim 1, wherein determining the at least one icon included in the virtual closed loop arranged along the boundary of the display based on the second input to the bezel ring comprises:

selecting one of icons in the second icon set arranged along the boundary of the display.

9. The method of claim 1, wherein the plurality of virtual closed loops comprises two-dimensional figures having substantially equivalent centers within a predetermined critical value range.

10. A wearable device, comprising:
a display;
a bezel ring provided along a boundary of the display;
a memory configured to store one or more instructions; and
at least one processor configured to execute the one or more instructions to:
hierarchically display each of a plurality of icon sets arranged along each of a plurality of virtual closed loops on the display of the wearable device, the plurality of virtual closed loops comprising a first virtual closed loop and a second virtual closed loop, and the plurality of icon sets comprising a first icon set arranged along the first virtual closed loop and a second icon set arranged along the second virtual closed loop,
obtain a first input to the bezel ring of the wearable device,
display the first virtual closed loop and the second virtual closed loop on the display of the wearable device by exchanging a position of the first virtual closed loop and a position of the second virtual closed loop based on the first input to the bezel ring,
determine at least one icon included in a virtual closed loop arranged along a boundary of the display based on a second input to the bezel ring, and
execute a preset function corresponding to the determined at least one icon.

11. The wearable device of claim 10, wherein the at least one processor is further configured to execute the one or more instructions to:
display the first icon set along the boundary of the display, and
display the second icon set in the second virtual closed loop configured by the second icon set,
wherein the second virtual closed loop is arranged closer to a center of the display than the first virtual closed loop which is displayed on the boundary of the display.

12. The wearable device of claim 11, wherein icons in the second icon set are displayed smaller than icons in the first icon set.

13. The wearable device of claim 11, wherein the at least one processor is further configured to execute the one or more instructions to
select one of the icons in the first icon set arranged along the boundary of the display.

14. The wearable device of claim 13, wherein the first input to the bezel ring or the second input to the bezel ring comprises at least one of a rotation of the bezel ring, a pressing of the bezel ring, or a squeezing of the bezel ring.

15. The wearable device of claim 11, wherein the at least one processor is further configured to execute the one or more instructions to,
based on the first input to the bezel ring,
display the second icon set along the boundary of the display, and
display the first icon set in the first closed loop configured by the first icon set,
wherein the first virtual closed loop is arranged closer to the center of the display than the second virtual closed loop which is displayed on the boundary of the display.

16. The wearable device of claim 15, wherein icons in the first icon set are displayed smaller than icons in the second icon set.

17. The wearable device of claim 10, wherein the at least one processor is further configured to execute the one or more instructions to select one of icons in the second icon set arranged along the boundary of the display.

18. The wearable device of claim 10, wherein the plurality of virtual closed loops comprises two-dimensional figures having substantially equivalent centers within a predetermined critical value range.

* * * * *